United States Patent
Toma et al.

[11] Patent Number: 5,867,212
[45] Date of Patent: Feb. 2, 1999

[54] SOLID-STATE IMAGE PICKUP DEVICE USING CHARGE COUPLED DEVICES WITH VACANT PACKET TRANSFER

[75] Inventors: Tetsuo Toma; Akio Sakoda, both of Miyagi, Japan

[73] Assignee: Fuji Photo Film Co., Ltd., Kanagawa, Japan

[21] Appl. No.: 536,460

[22] Filed: Sep. 29, 1995

[30] Foreign Application Priority Data

Sep. 30, 1994 [JP] Japan .................................... 6-237790
Dec. 14, 1994 [JP] Japan .................................... 6-310621
Dec. 14, 1994 [JP] Japan .................................... 6-310622

[51] Int. Cl.$^6$ .................................................. H04N 5/335
[52] U.S. Cl. .......................................... 348/311; 348/249
[58] Field of Search ..................................... 348/241, 243, 348/249, 250, 311, 317, 320, 324, 248; 257/230, 242; 377/58; H04N 5/335

[56] References Cited

U.S. PATENT DOCUMENTS

| | | | |
|---|---|---|---|
| 4,896,211 | 1/1990 | Hunt et al. ................................ | 348/132 |
| 5,051,797 | 9/1991 | Erhardt ..................................... | 257/230 |
| 5,376,967 | 12/1994 | Sakota et al. ............................ | 348/311 |
| 5,517,243 | 5/1996 | Kudo et al. .............................. | 348/296 |

*Primary Examiner*—Wendy Garber
*Assistant Examiner*—Tuan V. Ho
*Attorney, Agent, or Firm*—Sughrue, Mion, Zinn, Macpeak & Seas, PLLC

[57] ABSTRACT

A method of driving a solid-state image pickup device includes steps of using vertical charge-coupled devices each having a pixel section and a vacant packet section to fetch all the electric charges stored in photoelectric conversion elements to the pixel sections of the vertical charge-coupled devices, feeding vacant packets into the vertical charge-coupled devices from a horizontal charge-coupled device at every N-th row, thereby dispersing the vacant packets while transferring the electric charges to the lowermost row of the vacant packet section, feeding the vacant packets corresponding to one row to the vertical charge-coupled devices from the horizontal charge-coupled device during only a horizontal blanking period of each horizontal period to thereby cause the vacant packets to be transferred upwardly along the vertical charge-coupled devices by M rows (where M<N), while during a horizontal scanning period, the transfer along the vertical charge-coupled devices is interrupted and the electric charges corresponding to one row are transferred along the horizontal charge-coupled device.

29 Claims, 22 Drawing Sheets

C1 C2 C3 C4 C5  Cn C(n+1) C(n+3)  C(2n)  CYCLE C
          C(n+2)
HORIZONTAL CCD        HORIZONTAL CCD
TRANSFER              TRANSFER

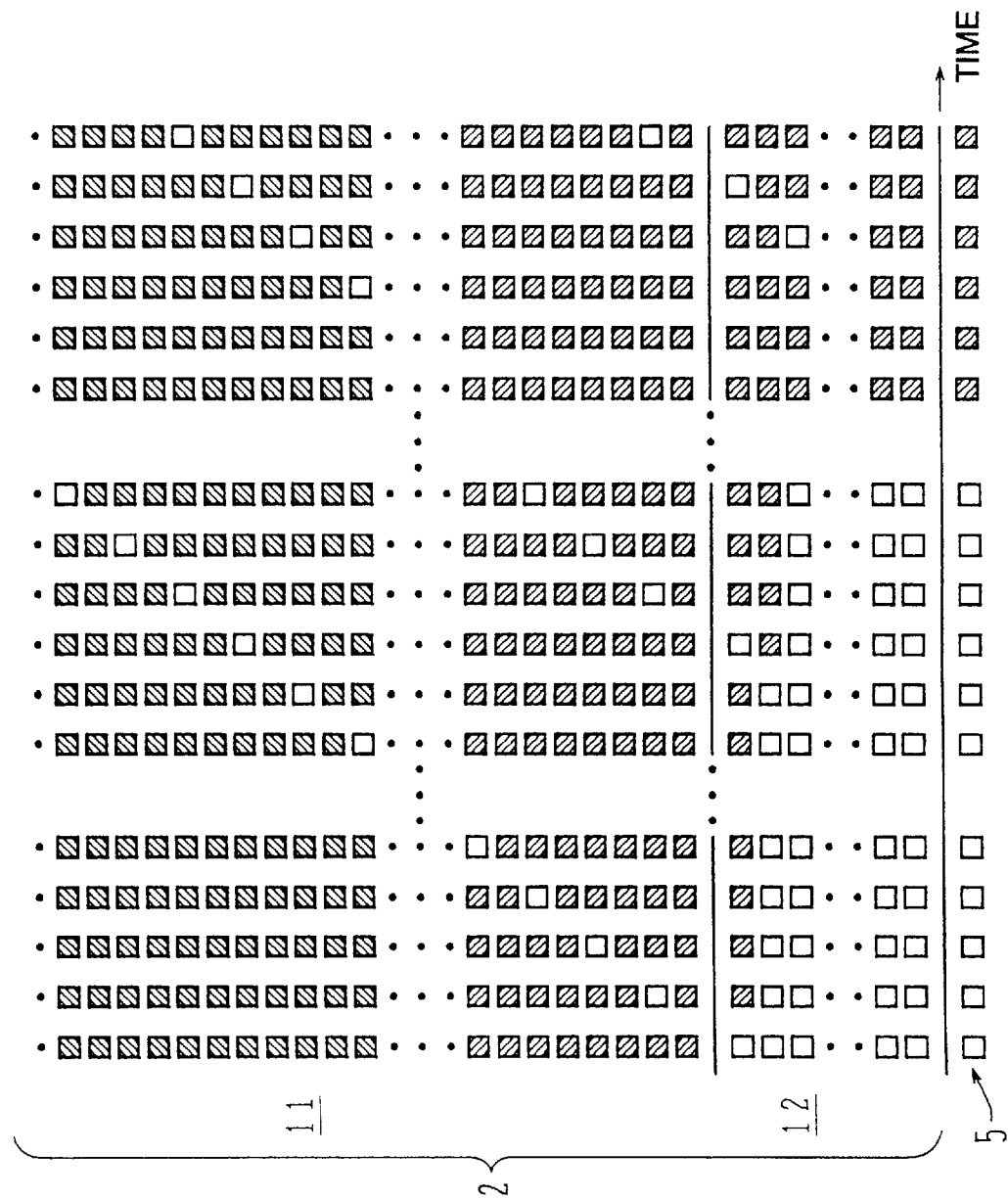

SOLID-STATE IMAGE PICKUP DEVICE USING CHARGE COUPLED DEVICES WITH VACANT PACKET TRANSFER

BACKGROUND OF THE INVENTION

1. Field of the Invention

The present invention generally relates to an image pickup device. More particularly, the present invention is concerned with a solid-state image pickup device comprised of photoelectric conversion elements such as semiconductor photodiodes PD and charge transfer paths formed by charge-coupled devices (hereinafter also referred to as the CCD in abbreviation). The invention is also concerned with a method of driving the same.

2. Description of Related Art

As the typical one of the solid-state image pickup devices, a CCD transfer type device is known and finds utilization in electronic cameras, copying machines or copiers, video apparatuses, and other applications.

In an interline-type solid-state image pickup device, a large number of photodiodes are disposed in the vertical and horizontal directions to thereby form a pixel matrix, wherein a vertical charge transfer path (VCCD) (hereinafter also referred to as a vertical CCD in abbreviation) constituted by charge-coupled device is provided adjacent to each of the photodiode columns. Further, a horizontal charge transfer path (HCCD) (hereinafter also referred to as a horizontal CCD in abbreviation) is formed adjacent to terminal ends of the individual vertical charge transfer paths to thereby allow video charge signals to be read out on a row-by-row basis.

In recent years, there arises a great demand for implementation of the solid-state image pickup device in a reduced or miniature size. In this conjunction, it is noted that even when the chip size is decreased from one inch to ⅔ inches, ½ inch or ⅓ inch in an effort to meet the demand, the number of the photodiodes will have to remain substantially unchanged because the number of the pixels in the vertical direction (i.e., columnwise direction) of the solid-state image pickup device has to satisfy the requirements imposed in view of the NTSC (National Television System Committee), PAL (Phase Alternation by Line) standard or other standards.

In order to read out the electric charges from all the photodiodes concurrently and independently from one another, at least two electrodes must be provided for one photodiode PD for enabling electric charge to be stored and isolated from one photodiode to another. However, with the provision of the two electrodes, it is impossible to transfer the electric charge. In other words, in order to transfer the electric charges without mixing them, it becomes necessary to provide at least three electrodes for each of the photodiodes.

However, reduction of the chip size will encounter a limitation in respect to the fine pattern processing or fine patterning, making it difficult to form three or more electrodes for each of the photodiodes PD.

In this conjunction, according to the standards NTSC, PAL or the like, interlaced image signals may be used and thus one frame can be obtained by scanning twice every other line on a field-by-field basis. In other words, one frame is constituted by two fields. To this end, there is employed the vertical charge transfer path having two transfer electrodes for each row of the photodiodes.

FIG. 10 shows only schematically a structure of a conventional solid-state image pickup device known heretofore.

Referring to the figure, a number of photodiodes designated by A1, A2; and B1, B2 are disposed in a matrix form, wherein a vertical charge transfer path (VCCD) is disposed in the close vicinity to each of the columns of the photodiodes. Disposed on the vertical charge transfer path (VCCD) are a pair of transfer electrodes for each of the photodiodes in such a manner that each photodiode is coupled to one of the electrodes (shown in phantom) of the vertical charge transfer path (VCCD) for electric charge transfer to the latter. The vertical charge transfer paths (VCCD) have respective bottom ends (as viewed in the figure) which are coupled to a horizontal charge transfer path (HCCD). With such structure of the solid-state image pickup device, electric charges corresponding to every column of photodiodes are transferred to the horizontal charge transfer path (HCCD) in parallel by way of the associated vertical charge transfer paths (VCCD), respectively, whereon these electric charges are serially transferred through the horizontal charge transfer path (HCCD) to the left as viewed in the figure.

The photodiodes (PD) are classified into two sets for a field A and a field B, respectively. The photodiodes for the field A as designated by A1, A2 and so forth and the photodiodes for the field B as designated by B1, B2 and so forth are arrayed alternately with each other in the columnwise direction. Upon reading the field A, only the electric charges of the photodiodes A1, A2 and so forth are transferred to the vertical charge transfer paths (VCCD). Thus, there are available four electrodes for each of the electric charges. Accordingly, the electric charge transfer through the vertical charge transfer paths (VCCD) can be realized by adopting a conventional four-phase driving scheme.

The electric charges read out to the vertical charge transfer paths (VCCD) are then transferred to the horizontal charge transfer path (HCCD) in parallel by one row during a horizontal blanking period to be subsequently transferred serially through the horizontal charge transfer path (HCCD) during a horizontal scanning period to be thereby read out for further processing.

By the way, in order to meet the demand for still image pick-up with a high fineness (or high definition), it is desired to read out or extract the electric charges from all the photodiodes concurrently en bloc. This is because the number of the pixels should be as large as possible for generating a picture of high fineness (or definition). In case all the electric charges are read out from all the pixels simultaneously to the vertical CCD, the electric charges will be present underneath every other transfer electrode in the vertical charge transfer path (VCCD).

As a method of reading all the electric charges from the image pickup device concurrently en bloc, there may be mentioned an accordion type electric charge transfer method. (For more particulars, reference should be made to, for example, an article of A. J. P. Theuwissen and C. H. L. Weijtens contained in PHILIPS TECHNICAL REVIEW, Vol. 43, No. ½, 1986.)

According to the accordion type electric charge transfer scheme mentioned above, only the electric charges resident at the lowermost electrode row of the vertical charge transfer paths (VCCD) are first transferred to the horizontal charge transfer path (HCCD). Subsequently, from the second rows of electrodes of the vertical charge transfer paths (VCCD) as counted from the bottom, electric charges are transferred to the horizontal charge transfer pa th (HCCD). When the electric charges of the second row from the bottom move downwardly by a distance corresponding to one electrode, there makes appearance a space corresponding to two electrodes between the electric charges of the third row and those of the second row. This means that the electric charges of the third rows are in the state ready for being transferred. In this manner, the electric charge transfer is carried out progressively from the bottom electrode row of the vertical charge transfer paths (VCCD) by converting an electric charge distribution per two electrodes to an electric charge distribution per four electrodes.

However, when the electric charges are read out by increasing twice the length of electric charge distribution, the electric charges near to the uppermost row of the vertical charge transfer paths (VCCD) are forced to be held at same locations for an extended period. By way of example, let's suppose a pixel matrix including vertical charge transfer path arrays having one thousand pixel rows. In that case, it is only after a distribution of electric charges for five hundred rows has been formed that the electric charges of the uppermost row can start to shift in and along the vertical charge transfer paths (VCCD). To say in another way, representing by 1H a single horizontal period, it is only after lapse of 500H that the transfer of the electric charges in the uppermost electrode row can be started.

At this juncture, it is to be mentioned that the electric charge transfer path realized by a semiconductor material is accompanied with a dark current which exhibits a location dependence characteristic. More specifically, an amount of dark current generated during a predetermined period differs from one to another place or location (position) in the electric charge transfer path. Thus, when the electric charge stored in the vertical charge transfer path (VCCD) is retained at a same location without being transferred, there makes appearance a defect which may be referred to as white defect due to the dark current.

Such being the circumstances, the transfer of electric charges in the uppermost electrode row of the vertical charge transfer paths (VCCD) should be started as early as possible in order to prevent or suppress the occurrence of the white defect due to the location-dependency of the dark current.

In addition, the amount of dark current accompanying the transfer of the electric charge depends on a length of time period during which the electric charge of concern is held in the semiconductor. As mentioned previously, the electric charges in the lowermost electrode row of the vertical charge transfer paths (VCCD) are read out during the first horizontal period, while the electric charges in the uppermost row are read out during the 1000-th horizontal period. Such difference in the time duration for which the electric charges are held in the vertical charge transfer paths (VCCD) before being read out brings about gradual variation or difference in the amount of the dark current on an average, incurring dark current difference or gradation which is referred to as the shading. In order to reduce the difference or variation in the dark current, the time taken for reading out all the pixels (i.e., frame period) should be shortened to a possible minimum.

SUMMARY OF THE INVENTION

In the light of the state of the art described above, it is an object of the present invention to provide a solid-state image pickup device of an improved structure which is capable of reducing the white defect as well as difference or variation in the dark current.

Another object of the present invention is to provide a method of driving a solid-state image pickup device in such a manner that the white defect as well as the dark current variation or difference can be suppressed or reduced.

In view of the above and other objects which will become apparent as the description proceeds; there is provided according to a first aspect of the present invention a method of driving a solid-state image pickup device by making use of a horizontal period, the solid-state image pickup device which the invention concerns includes a number of photoelectric conversion elements disposed in a matrix-like array, a plurality of columns of vertical charge-coupled devices each disposed adjacent to each column of the photoelectric conversion elements and including a pixel section capable of picking up electric charges accumulated in the photoelectric conversion elements and a vacant packet section having a number of rows, and a horizontal charge-coupled device connected to the plural columns of vertical charge-coupled devices and capable of receiving in parallel electric charges transferred from the vertical charge-coupled devices and serially outputting the electric charges. The method of driving the solid-state image pickup device of the structure mentioned above includes steps of reading electric charges accumulated in all of a number of the photoelectric conversion elements simultaneously and storing the electric charges in the pixel sections of the vertical charge-coupled devices, injecting vacant packets into a congregation of signal charges in each of the vertical charge-coupled devices, each of the vacant packets being in an electric-charge absent state, to thereby disperse the vacant packets into the congregation of electric charges in such a distribution that the vacant packets are present in every Nth row injecting and dispersing step until the signal charge existing at a bottom row of the pixel section is transferred to a bottom row of the vacant packet section, and sending one row of vacant packets from the horizontal charge-coupled device to the vertical charge-coupled devices to thereby shift the vacant packets upwardly through the vertical charge-coupled devices by M rows (where N>M) during a horizontal blanking period in each of the horizontal periods, while inhibiting the transfer of the vacant packets to the vertical charge-coupled devices during a horizontal scanning period in each of the horizontal periods to thereby allow the electric charges corresponding to one row to be transferred through the horizontal charge-coupled device.

According to another aspect of the present invention, there is provided a solid-state image pickup device which includes a number of photoelectric conversion elements disposed in a matrix-like array, a plurality of columns of vertical charge-coupled devices each disposed adjacent to each column of the photoelectric conversion elements and including a pixel section capable of picking up electric charges accumulated in the photoelectric conversion elements and a vacant packet section having a number of rows, a horizontal charge-coupled device connected to the plural columns of vertical charge-coupled devices and capable of receiving in parallel electric charges transferred from the vertical charge-coupled devices and outputting serially the electric charges, and a control circuit for transferring stored signal charges from all of the photoelectric conversion elements simultaneously to the vertical charge-coupled devices, injecting vacant packets into a congregation of signal charges in each of the vertical charge-coupled devices to thereby disperse the vacant packets into the congregation of electric charges in such a distribution that the vacant packets are present in every Ni from the horizontal charge-coupled device to the vertical charge-coupled devices to thereby shift the vacant packets upwardly through the vertical charge-coupled devices by M rows (where N>M) during a horizontal blanking period in each of the horizontal periods.

According to yet another aspect of the present invention, there is provided a method of driving a solid-state image pickup device which includes a number of photoelectric conversion elements disposed in a matrix-like array, plural columns of vertical charge-coupled devices each comprised of transfer electrodes provided in association with each of the photoelectric conversion elements and arrayed in a columnwise direction, each of the transfer electrodes being capable of fetching electric charge stored in the associated photoelectric conversion element into a channel region underlying each of the transfer electrodes and capable of transferring the electric charges in the columnwise direction in synchronism with a drive signal, a horizontal charge-coupled device connected to the plural columns of vertical charge-coupled devices and capable of receiving in parallel the electric charges transferred from the vertical charge-coupled devices and serially outputting the electric charges, the transfer electrodes constituting the vertical charge-coupled devices being divided into a plurality of sets each including the transfer electrodes corresponding to plural consecutive rows of the photoelectric conversion elements, the plurality of sets constituting a plurality of unit driver stages, respectively, a shift register including a plurality of shift stages connected in cascade to each other, for outputting either one of a shift signal and a shift inhibit signal, an input terminal for inputting either one of the shift signal and the shift inhibit signal to the shift stage corresponding to the unit driver stage located at an end of the horizontal charge-coupled device, the signal inputted to the input terminal being sequentially shifted through the shift stages in synchronism with a clock signal supplied externally, and a drive signal control means for supplying the drive signal to the transfer electrodes of the unit driver stage corresponding to the shift stage from which the shift signal is outputted, while inhibiting supply of the drive signal to the transfer electrodes of the unit driver stage corresponding to the shift stage from which the shift inhibit signal is outputted. The driving method for the solid-state image pickup device of the structure described above includes an electric charge fetching step of fetching signal charges stored in a number of the photoelectric conversion elements into channel regions each underlying the transfer electrodes, a reset step of inputting the shift inhibit signal to the input terminal while supplying the clock signal to the shift register, to thereby allow the shift inhibit signal to be outputted from all of the shift stages, and a vertical transfer step of inputting the shift signal to the input terminal while supplying the clock signal to the shift register to thereby cause the shift stage outputting the shift signal to be sequentially shifted while supplying the drive signal to each of the transfer electrodes of the unit driver stage corresponding to the shift stage outputting the shift signal, for thereby allowing the electric charges stored underneath the transfer electrodes to be transferred along the vertical charge-coupled devices.

According to a further aspect of the present invention, there is provided a method of driving a solid-state image pickup device which includes a number of photoelectric conversion elements disposed in a two-dimensional array and charge-coupled devices capable of fetching therein electric charges stored in the photoelectric conversion elements and outputting the fetched electric charges. The driving method includes a smear charge sweep-away step for driving the charge-coupled devices to transfer smear electric charges, if stored in the charge-coupled devices, to thereby output the smear electric charges externally of the device, an exposure starting step for stopping the smear charge sweep-away operation in synchronism with an exposure start signal supplied externally to thereby set the photoelectric conversion elements to the state capable of storing electric charges, an exposure step for exposing the photoelectric conversion elements in a state in which the electric charge transfer through the charge-coupled devices is inhibited, to thereby store electric charges through photoelectric conversions performed by the photoelectric conversion elements, and a step of fetching electric charges stored at a number of the photoelectric conversion elements into the charge-coupled devices.

In the case of the arrangement in which the vertical CCD has no more than two electrodes for every one row of the photodiodes and in which the electric charges are to be transferred by pulling gradually the electric charge distribution within the vertical CCD from the side located closer to the horizontal CCD, the stored signal charges which are capable of being transferred along and through the vertical CCDs can be increased only by an amount which corresponds to one row. As a consequence, transfer of the electric charges stored at locations near to the top of the vertical CCDs and remote from the horizontal CCD can not readily be started.

When the vacant packet carrying no electric charge is transferred from the horizontal CCD to the vertical CCD, the signal charges are shifted downwardly each by one row within a region into which the vacant packets are transferred by one row. Although it is impossible to transfer two or more rows of vacant packets during a single horizontal period because then two or more rows of signal charges are read out to the horizontal CCD, there is imposed no limitation to the number of rows by which the vacant packets are transferred during a single horizontal period so long as the vacant packets of one row is concerned. Accordingly, transfer of the signal charges located near the top of the vertical CCDs can be started at an earlier time point.

The horizontal period (1 H) includes a horizontal blanking period and a horizontal scanning period. During the horizontal scanning period, the electric charges are transferred along and through the horizontal CCD. In this conjunction, it is noted that when the electric charge transfer is performed through the vertical CCDs during the charges are transferred through the horizontal CCD, the picture or image signal as read out from the solid-state image pickup device will be superposed with noise. For this reason, the vacant packet transfer through the vertical CCD is required to be effectuated during the horizontal blanking period.

When the vacant packet transfer rate is to be increased, the number of rows the vacant packets are transferred during the single horizontal period has to be increased, which means that there arises necessity of lengthening the duration of the horizontal blanking period. In that case, the single horizontal period is lengthened, incurring a lot of time for reading out all the electric charges and hence an increase in the difference of the dark current.

On the other hand, when the time taken for reading out all the electric charges as stored is shortened in an effort to decrease the difference in the dark current, it becomes then necessary to decrease the duration of one horizontal period (1 H), which results in slower transfer rate of the vacant packets. Thus, lots of time will be taken before starting the transfer of the signal charges located topmost in the vertical CCDs.

By contrast, when the vertical CCD includes a pixel section disposed adjacent to the photoelectric conversion elements and a vacant packet section including a predetermined number of vacant packet rows, as taught by the inventor, a step or process can be carried out for dispersing the signal charges to all the vertical CCDs as a whole from the pixel section. During this period, the electric charge transfer is not effected in the horizontal CCD. Thus, it is possible to transfer the vacant packets by making use of the horizontal period fully.

Thus, even when one row of vacant packets are to be transferred by M rows during the horizontal blanking period, it is possible to transfer one row of vacant packets per N rows (where N>M) during the dispersing process or step. Incidentally, it is to be mentioned that no electric charge transfer can take place during the vacant packet dispersing process. Accordingly, two or more vacant packet rows may be transferred to the pixel section during one horizontal period.

In this manner, by transferring the vacant packets for M rows during one horizontal period in the transfer step in succession to the vacant packet diffusing step where the vacant packets are transferred in such a manner that vacant packets are dispersed in one row at every N-th row (where N>M), it becomes possible to move the electric charges located at the topmost row of the vertical CCDs as early as possible, to thereby complete the read-out operation of all the stored electric charges within a relatively short time.

The time for which the stored electric charge is resident at one place or location can be shortened, whereby the so-called white defect can be reduced. Besides, because the time taken for reading out all the stored electric charges is relatively short, difference in the dark current can be made insignificant.

Parenthetically, by selecting N to be greater than M, the number of rows of the signal charges moving from the pixel section during the dispersing process can be decreased, which in turn means that the vacant packet section can be implemented in a small size.

By supplying the shift signal or the shift inhibit signal to the unit driver stage constituted by a predetermined number of consecutive transfer electrodes of the vertical CCD, it becomes possible to supply the vertical CCD drive signal only to the unit driver stages to which the shift signal is supplied. By supplying the drive signal only to the unit driver stage located at the end of the vertical CCD connected to the horizontal CCD while inhibiting supply of the drive signal to the other unit driver stages, it is possible to feed the vacant packets into the above-mentioned unit driver stage from the horizontal CCD.

By sifting from one to another the unit driver stages to which the drive signal is supplied, it is possible to transfer the vacant packets across the unit driver stages in the vertical CCDs.

By inputting the shift inhibit signal to the first stage of the shift register and sifting sequentially this shift inhibit signal, it is possible to reset the shift register. By virtue of this arrangement, necessity of providing a reset circuit for each of shift stages can be avoided. The shift stages of the shift register are formed in correspondence to the transfer electrodes of the vertical CCD. This arrangement is very effective for diminishing the chip size or implementing the transfer electrodes in finer structure with the aim of achieving a high resolution.

The shift register can be reset rapidly by selecting as the clock for resetting the shift register a clock signal having a higher rate than that used for the electric charge transfer.

Owing to the arrangement that the smear charges are swept away in precedence to the exposure and the driving of the vertical CCDs is stopped upon exposure, the smear electric charges generated during the exposure process are prevented from moving through the vertical CCDs. In this way, generation of ghost images due to smear charges produced during the exposure can positively be excluded.

Furthermore, by effecting the smear charge sweep-away operation up to a time point immediately before the exposure, the smear charges generated immediately in precedence to the exposure can be swept away. After the smear charge sweep-away operation, the vertical CCDs are usually set to the pinning state with a view to suppressing the dark current. When the vertical CCDs are set to the pinning state, no potential barrier can be formed in the channel region. This means that the smear charge can be diffused along the transfer paths by the vertical CCDs. Thus, the diffused electric charges may be superposed in the signal charges to be extracted, which results in blurring of the image.

However, by performing the smear charge sweep-away operation up to the time point immediately before the exposure, the blurring of the image or picture due to the diffusion of the smear charges as mentioned above can be prevented with high reliability.

As is apparent from the foregoing description, in the solid-state image pickup devices implemented according to the teachings of the present invention, difference in the dark current can be suppressed to a level sufficiently low level for reducing the so-called white defect. Besides, because the smear electric charges generated immediately before the exposure are swept away, there can be generated clear images.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 22 is a view showing schematically another configuration of a solid-state image pickup device proposed previously.

DESCRIPTION OF THE PREFERRED EMBODIMENTS

Figure 1:
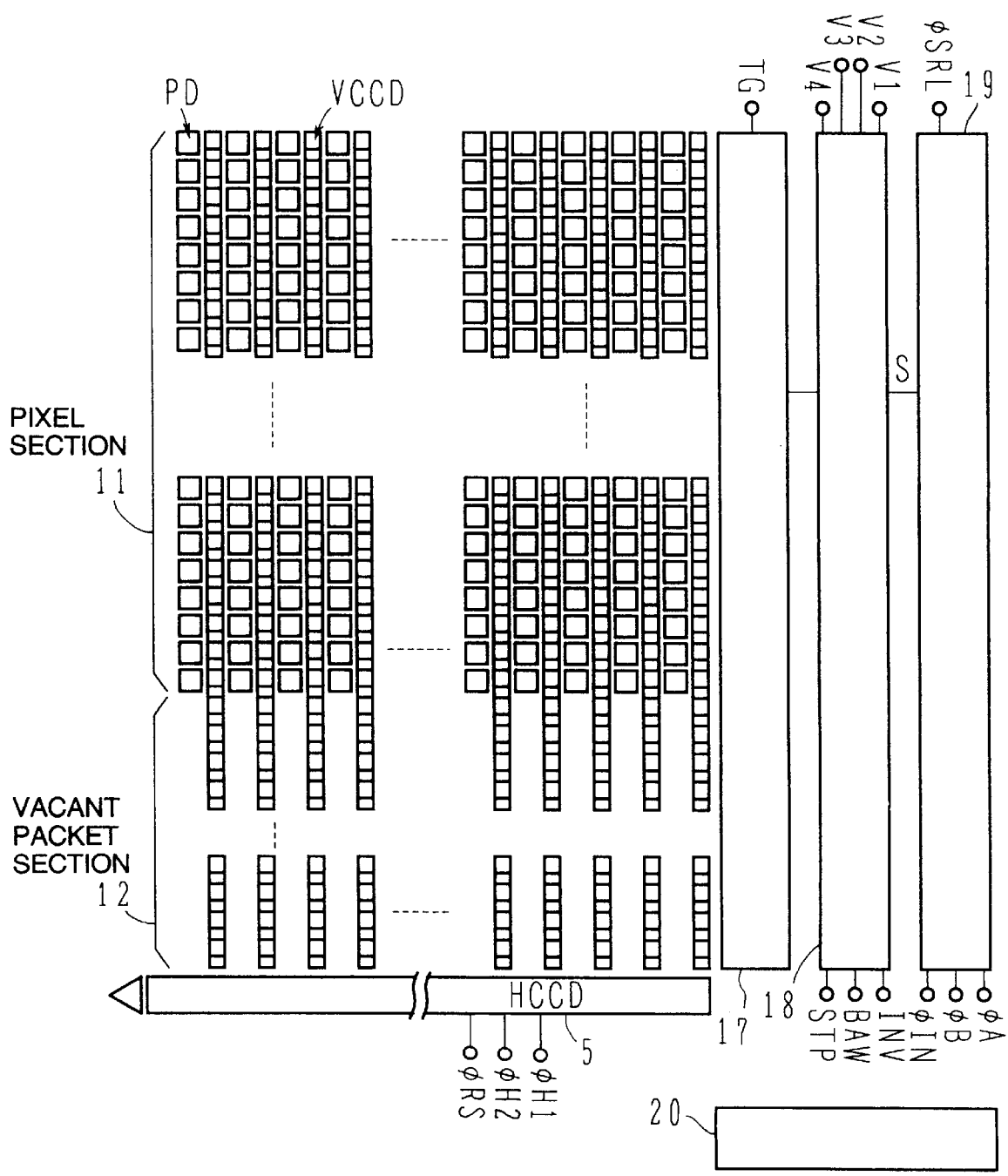
FIG. 1 is a schematic diagram showing only schematically a structure of a solid-state image pickup device according to an embodiment of the present invention.

Now, the present invention will be described in detail in conjunction with what is presently considered as preferred or typical embodiments thereof by reference to the drawings. In the following description, like reference characters designate like or corresponding parts or items throughout the several views. Also in the following description, it is to be understood that such terms as "left", "right", "horizontal", "vertical", "top", "bottom", and the like are words of convenience and are not to be construed as limiting terms.

Before entering into detailed description of the exemplary or preferred embodiments of the present invention, a vertical vacant packet transfer type solid-state image pickup device proposed previously, in U.S. Pat. No. 5,376,967 (Dec. 27, 1994) by one of the present inventors and his colleague, which is incorporated herein by reference, will be elucidated in some detail for having a better understanding of the teachings of the invention.

Figure 17A:
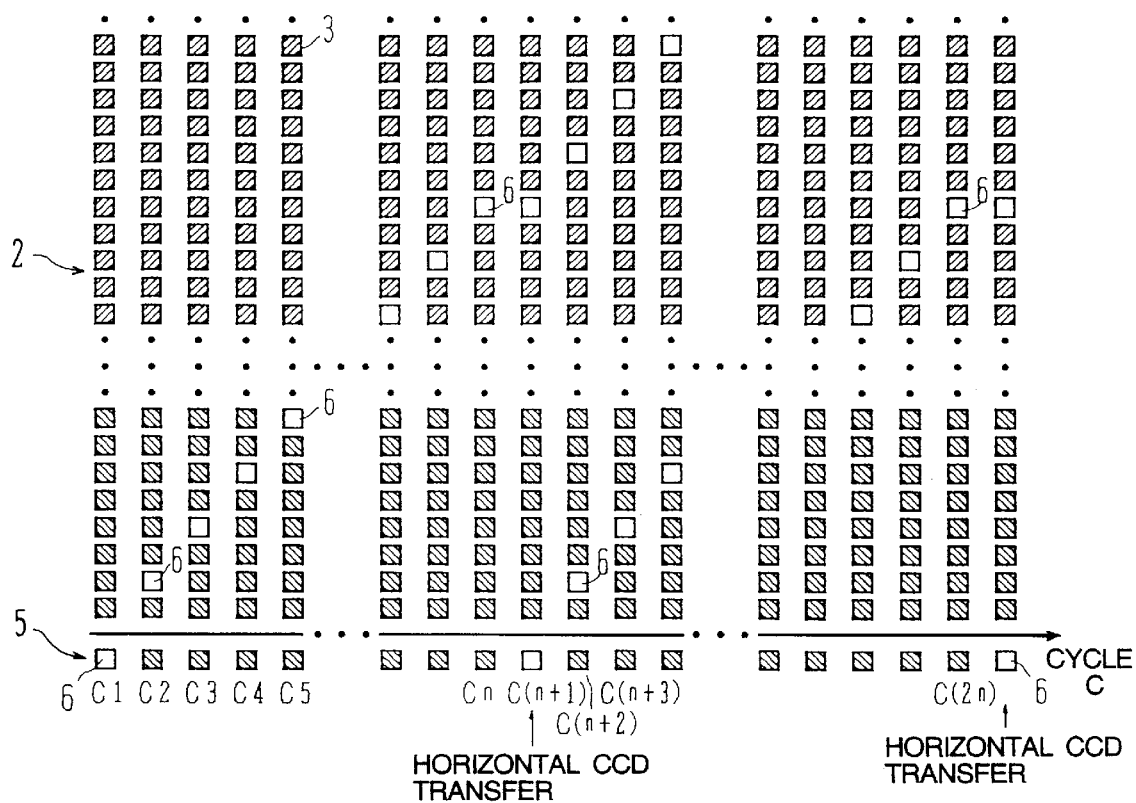
FIGS. 17A and 17B are schematic diagrams for explaining a solid-state image pickup device according to a preceding application.

FIG. 17A is a view for illustrating changes or variations in an electric charge distribution in both a vertical CCD (VCCD) 2 and a horizontal CCD (HCCD) 5. In the figure, the electric charge distributions in the vertical CCD 2 and the horizontal CCD 5 are taken along the ordinate with the time being taken along the abscissa.

Figure 17B:
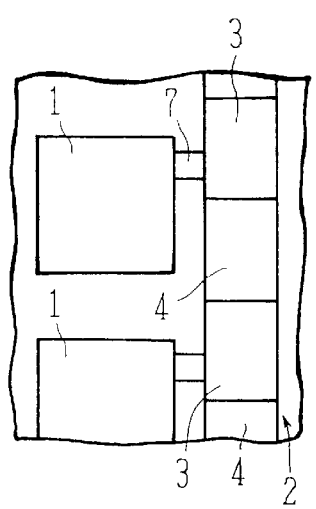

Further, FIG. 17B is a view for illustrating only schematically a positional relationship among photodiodes (PD) 1 which serve as the photoelectric conversion elements and the vertical CCD 2.

Referring to the figure, at a cycle C1 shown at the leftmost end in FIG. 17A, the stored electric charges of all the photodiodes 1 are transferred to the vertical CCD 2. In this conjunction, hatched squares represent electrodes at which the stored electric charges are present. In actually, there exist electrodes forming potential barriers formed between these electrodes. However, these potential barrier forming electrodes are omitted from illustration for the purpose of clarification thereof. Thus, in FIG. 17A, only one electrode is shown for each row of the photodiodes 1.

Referring to FIG. 17B, there are formed in the vertical CCD 2 a pair of transfer electrodes 3 and 4 for each row of the photodiodes 1, of which the transfer electrode 3 is connected to the photodiode 1 by way of a transfer gate 7.

Accordingly, in the cycle or time point C1 at which the electric charges are transferred from all the photodiodes 1 to the vertical CCD 2, the electric charges are stored in the vertical CCD 2 under all the electrodes 3 which are placed every other electrode. In this conjunction, it is to be noted that when the potential under the electrode 4 forming the barrier between the adjacent electrodes 3 under which the electric charges as transferred from the photodiode 1 are stored is lowered in this state, then a charge mixing will take place.

On the other hand, the horizontal CCD 5 has no electric charge stored therein at the time point or cycle C1, but has a vacant packet 6 indicated by a blank square.

In the next cycle C2, the vacant packet 6 which exists at the horizontal CCD 5 is transferred to the area underneath the second lowest electrode of the vertical CCD 2. Consequently, the electric charges stored in the areas under the bottom electrode and the second lowest electrode (i.e., the second electrode as countered from the bottom), respectively, are shifted to the areas one row below. In that case, by transferring at first the electric charge in the area under the bottom electrode of the vertical CCD 2 to the horizontal CCD 5 and then transferring the electric charge in the area under the second lowest electrode to the area under the bottom electrode, it is possible to shift the vacant packet 6 to the vertical CCD 2 at the lowest second row without incurring the charge mixing.

Subsequently, as the time proceeds to the cycles C3, C4, and then to C5, the vacant packet 6 is shifted upwardly once by two rows in every cycle. In this manner, in a cycle Cn, the vacant packet is shifted to the area under the 2(n−1)-th electrode as counted from the bottom or lowest electrode.

It is assumed that the time span from the cycle C1 to the cycle Cn inclusive, represents one period. At the end of one period (i.e., in the cycle Cn), the electric charges in the horizontal CCD 5 are transferred. As the electric charges in the horizontal CCD 5 are transferred and outputted, a vacant packet corresponding to one row is generated in the horizontal CCD 5. The state such as shown at a time point or cycle C(n+1) is thus prevailing currently.

Through a similar process, the vacant packet 6 in the vertical CCD 2 transferred from the horizontal CCD 5 in the cycle C(n+2) is sequentially transferred upwardly in the vertical CCD 2 to finally reach the predetermined position again at the time point or cycle C(2n). This process is similar to the process from the cycle C2 to the cycle Cn described above.

In this manner, at the time point or cycle C(2n), the vacant packet 6 sent into the vertical CCD 2 at the cycle C(n+2) is shifted to the predetermined position. In the cycle C(2n+1), the electric charges stored in the horizontal CCD are transferred to be outputted, whereby a vacant packet is again generated in the horizontal CCD 5.

By repeating the process or operation mentioned above, the vacant packet 6 moves upwardly in the vertical CCD 1 by 2(n−1) rows every time the horizontal charge transfer is carried out for the horizontal CCD 5. As the vacant packet 6 displaces upwardly, the electric charge at the area under the electrode changes its position downwardly by one row.

The moving speed of the vacant packet can be selected to be faster than that of the electric charge per one period. As a result of this, it is possible to prevent or exclude such situation that the electric charge located at positions distanced from the horizontal CCD is held at the same locations over an extended time span, as in the case of the conventional solid-state image pickup device known heretofore prior to the solid-state image pickup device proposed in the preceding application now under consideration, whereby the electric charges are allowed to change respective positions cyclically at a predetermined time interval. Consequently, adverse influence of the dark current mentioned hereinbefore can be suppressed correspondingly, while preventing generation of fixed pattern or so-called white defect.

Figure 18:
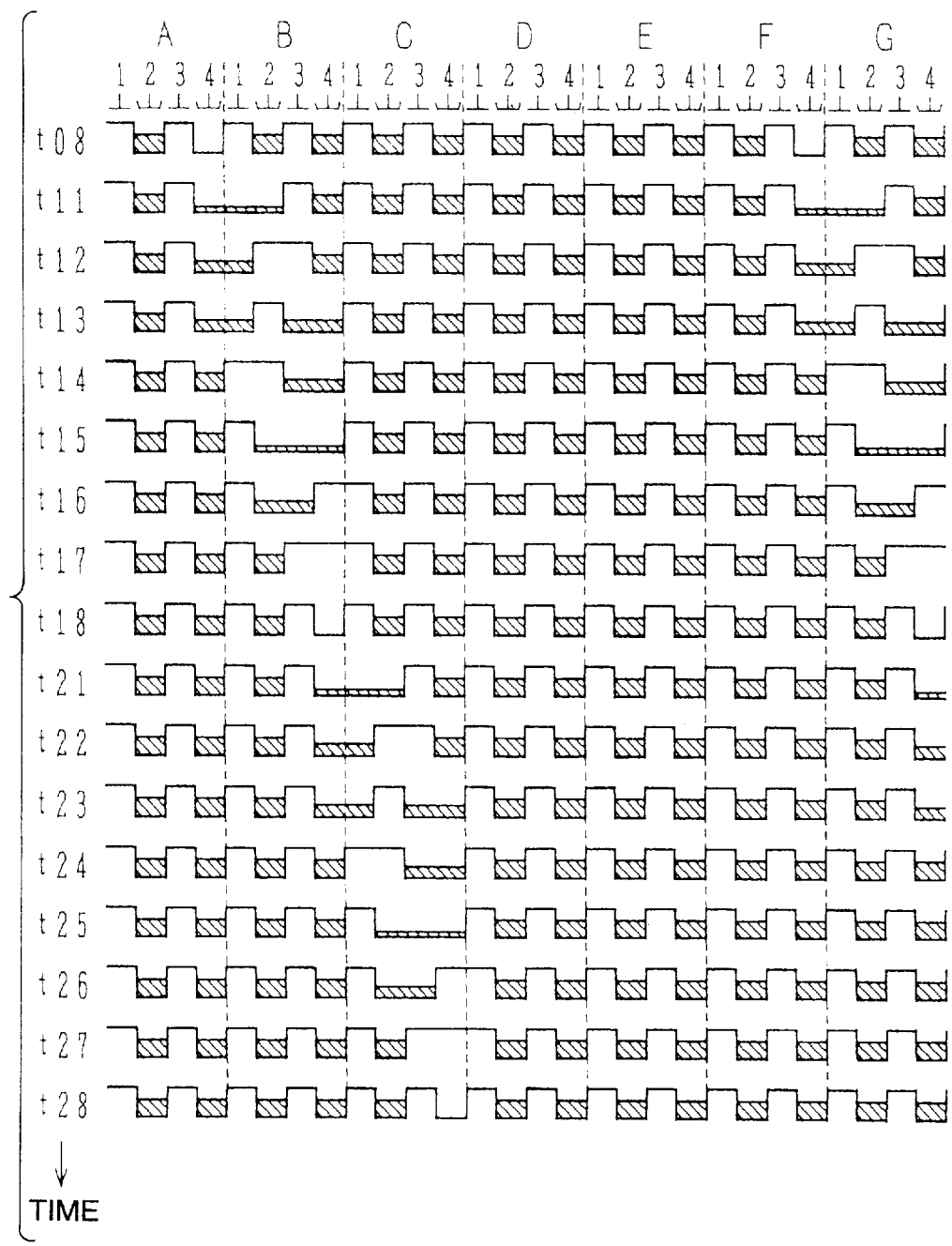
FIG. 18 is a potential diagram for illustrating a manner in which electric charge transfer takes place in a vertical CCD.

FIG. 18 is a potential diagram for illustrating a manner in which the electric charge transfer takes place in the vertical CCD, wherein the potential is taken along ordinate as a function of time. When electric charge is formed by electrons, the downward direction corresponds to the positive-going direction of the voltage. In FIG. 18, upper potential level represents low voltage level with lower potential level representing a middle voltage level. A high voltage level is used for reading out the electric charges from the photodiodes to the vertical CCD, which voltage level however does not make appearance in the potential diagram of FIG. 18.

The vertical CCD 2 is divided into unit driver stages on a two-by-two row basis and shown along the abscissa FIG. 18 with reference characters A, B, C, . . . being affixed thereto. The time lapse is taken along the ordinate as well, wherein the time lapse of eight divisions, e.g. from t11 to t18, corresponds to one cycle C shown in FIG. 17A.

In the case of the electric charge distribution diagram shown in FIG. 17A, it has been assumed that the vacant packets are each distributed at every 2(n−1)-th row. In the case of the example shown in FIG. 18, it is assumed that the vacant packets are distributed at every tenth row. Furthermore, although only those electrodes of the vertical CCDs which are connected to the photodiodes 1 are shown in FIG. 17A, electrodes 3 of the vertical CCD connected to the photodiodes 1 as well as the interposed electrodes 4 are shown in FIG. 18. Accordingly, in FIG. 18, there are shown four electrodes for each of the unit driver stages A, B, C, . . . , which electrodes are denoted by reference numerals 1, 2, 3 and 4 sequentially from the left-hand side. In the description which follows, each of the electrodes is designated by a combination of one alphabetic letter indicating the associated unit driver stage and one relevant numeral 1, 2, 3 or 4.

At the time point t08, vacant packets are distributed to the areas underlying the electrodes A4 and F4. At a succeeding time point t11, the potentials of the electrodes B1 and G1 are each set to a middle level $V_M$, whereby potential wells are formed under these electrodes, respectively. Accordingly, the electric charges accommodated underneath the electrodes B2 and G2 are distributed underneath three electrodes A4 to B2 and F4 to G2, respectively.

Subsequently, at a time point t12, the potentials under the electrodes B2 and G2 are raised, respectively. As a result of this, the electric charges distributed over the two sets of three electrodes mentioned above are squeezed to underlie two electrodes A4 and B1 on one hand and underlie two electrodes F4 and G1 on the other hand.

At a time point t13, the potentials of right portions of the potential barriers each formed over two electrodes, i.e., the potentials under the electrodes B3 and F3 are lowered, whereby the electric charges stored under the electrodes B4 and G4 are each forced to distribute over two electrodes.

At a time point t14, the potentials under the electrodes B1 and G1 are raised so that the electric charges distributed over two electrodes A4 and B1 and two electrodes F4 and G1, respectively, are confined to the areas underneath the electrodes A4 and F4, respectively. At this stage, the electric charges stored under the electrodes B2 and F2 have been moved by one row and stored under the electrodes A4 and F4, respectively.

At a next time point t15, the potentials under the electrodes B2 and G2 are lowered, as a result of which the potential barriers corresponding to a two-electrode length are squeezed to a one-electrode length, whereby the electric charges distributed over two electrodes B3 and B4 and over two electrodes G3 and G4, respectively, are distributed over three electrodes B2 and B4 on one hand and over three electrodes G2 to G4 on the other hand.

At a time point t16, the potentials under the electrodes B4 and G4 are raised to thereby squeeze the electric charges distributed over three electrodes to a two-electrode distribution. At a succeeding time point t17, the potentials under the electrodes B3 and G3 are raised to squeeze the two-electrode charge distribution to one-electrode charge distribution. At this stage, the electric charges stored underneath the electrodes B4 and F4 have been moved by one row and stored now under the electrodes B2 and F2, respectively.

At a time point t18, the potentials under the electrodes B4 and G4 are lowered, whereby vacant packets are generated under the electrodes B4 and G4. Due to the operations described above, the vacant packets located under the electrodes A4 and F4 at the time point t08 have been moved by two rows to the positions B4 and G4 at the time point t18. To say in another way, the vacant packets are caused to displace or move by two rows during a period in which the electric charges in the unit driver stage B shifts by one row.

The charge shift during a period from a time point t11 to a time point t18 can be performed by controlling only the potentials under the electrodes belonging to the unit driver stages B and G. During this period, the potentials in the unit driver stages A and C to F are held stationarily. Thus, similar cycles have to be repeated five times in order to allow the electric charges at the unit driver stages A to E to shift by one row.

During a period extending from a time point t21 to a time point t28, the potentials at the unit driver stages C and H (not shown) are so controlled as to perform operations similar to those performed during the period from the time point t11 to the time point t18, to thereby allow the vacant packets resident beneath the electrodes B4 and G4 to shift to the areas underlying the electrodes C4 and H4, respectively. By repeating charge transfer operations described above, it is possible to move the vacant packets in the vertical CCD at a speed ten times as fast as the transfer speed of the electric charges in the vertical CCD.

The electric charges resident, for example, beneath the electrodes B2 and B4 are caused to displace to the areas under the electrodes A4 and B2, respectively, during one cycle from the time point t11 to the time point t18. By shifting the locations for the electric charges in this manner, generating of the dark current can effectively be suppressed. Moreover, the temporal period during which the same electric charge is held at the same location or position can be shortened, whereby generation of a fixed pattern noise can be suppressed as well.

Figure 19:
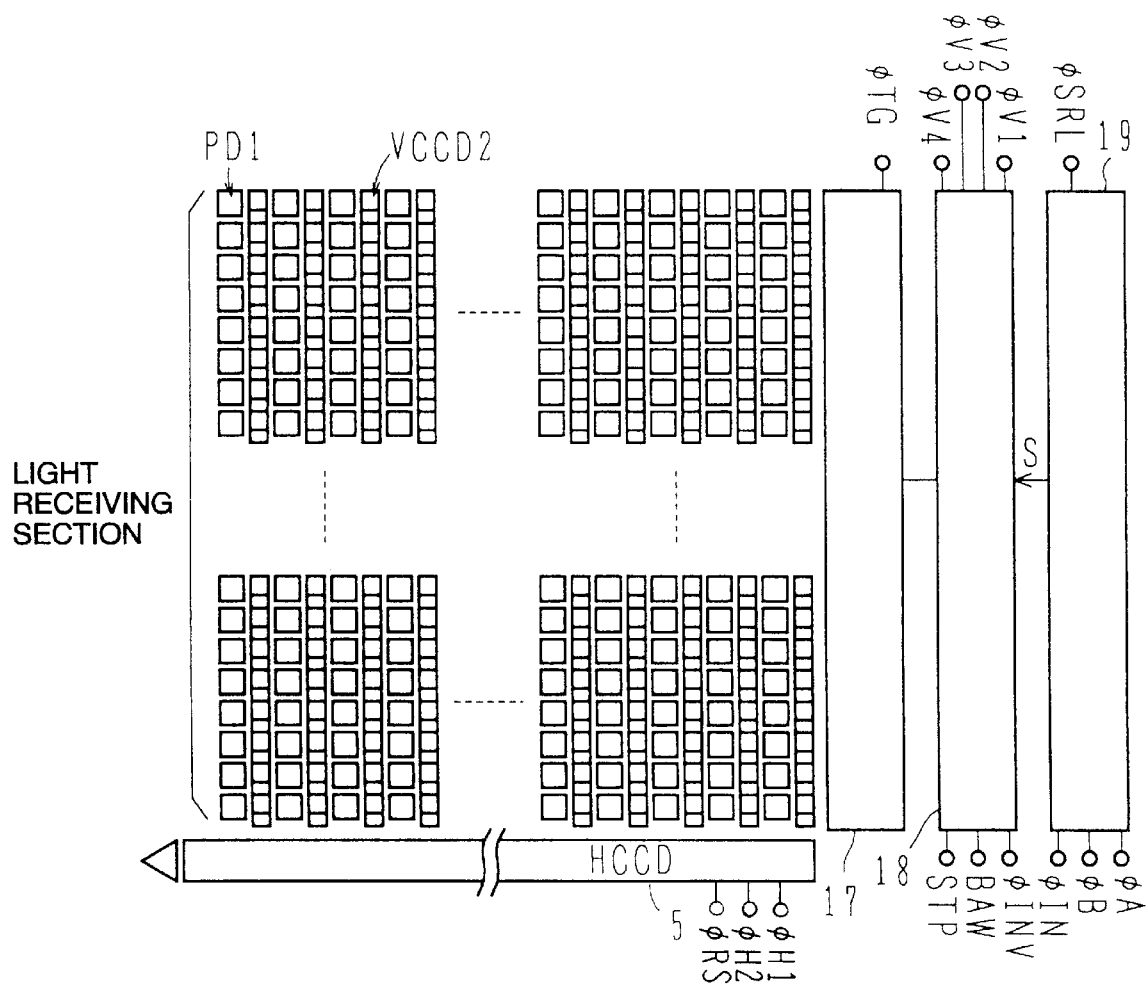
FIG. 19 shows schematically a circuit incorporated in the solid-state image pickup device shown in FIG. 17A.

FIG. 19 shows schematically a circuit incorporated in the solid-state image pickup device which is designed to perform the electric charge shift/transfer control in the manner described above. In the figure, there are shown only schematically a matrix-like array of the photodiodes 1, a plurality of vertical charge transfer paths (vertical CCD) 2 each coupled to each of the columns of the photodiode matrix-like array, and a horizontal charge transfer path (horizontal CCD) 5 connected to the plurality of the vertical charge transfer paths (vertical CCD) 2 at respective bottom ends thereof.

A transfer gate signal φTG is supplied from a read pulse control circuit 17 for transferring the electric charges from the photodiodes 1 to the vertical CCD 2.

On the other hand, a transfer pulse control circuit 18 is designed to generate four drive signals φV1, φV2, φV3 and φV4 which are to be applied to four transfer electrodes in each unit driver stage on a two-by-two row basis shown in FIG. 18. Additionally, a control circuit 18 serves to supply a barrier forming voltage BAW and a storage well forming voltage STP to the sets of transfer electrodes which are not supplied with the drive signals mentioned above in accordance with a timing signal φINV for controlling the timing of applications of the aforementioned voltages.

Further provided is a shift resister 19 which responds to reception of control signals φA, φB, φIN and φSRL to thereby generate a signal S for controlling such that the transfer signal is supplied only to those parts for which the charge transfer is to be performed by the transfer pulse control circuit 18.

Figure 20A:
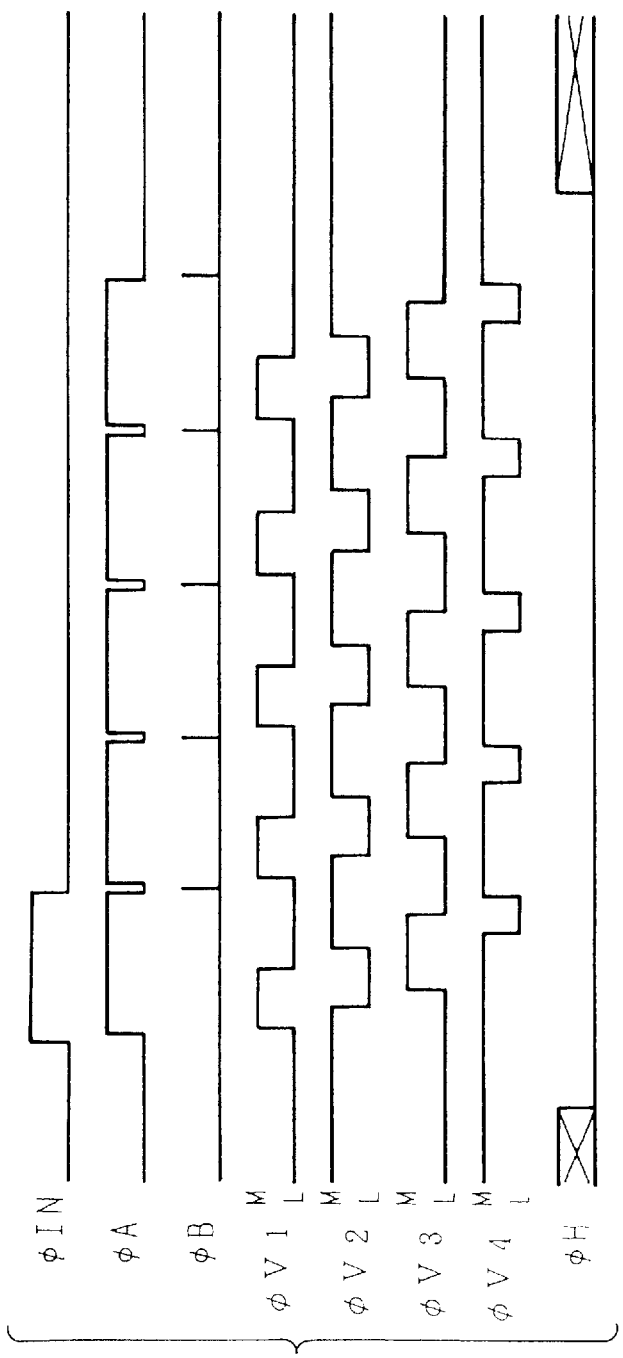
FIGS. 20A and 20B are timing charts showing various control signals employed in the device shown in FIG. 19.
Figure 20B:
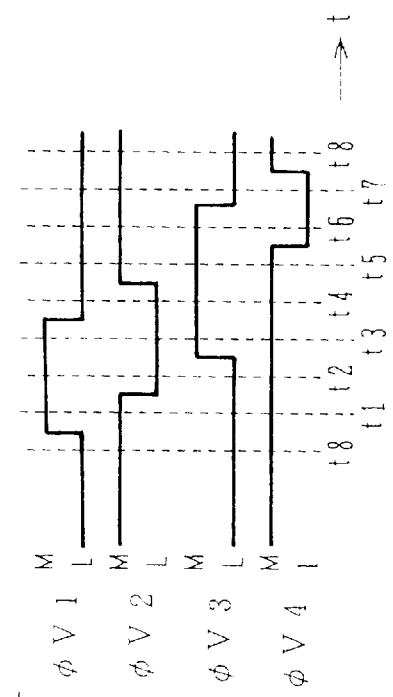

FIGS. 20A and 20B are timing charts illustrating control signals for effecting the charge transfer described above by reference to FIG. 18. More specifically, FIG. 20A shows the input signals φIN, φA and φB to the control circuit, drive signals φV1, φV2, φV3 and φV4 applied to the four types of electrodes shown in FIG. 18 together with a drive signal φH applied to the horizontal CCD 5.

On the other hand, FIG. 20B is a timing chart showing drive signals φV1, φV2, φV3 and φV4 applied to the four types of electrodes on a magnified scale. During a period in which the control signal φA is at high level, a pulse makes appearance in each of the four-phase drive signals φV1 to φV4 at respective phase positions.

Now, referring to FIG. 20B, at a time point t8, the drive signals φV1 and φV3 are at a low level L while the drive signals φV2 and φV4 are at a middle level M. This state corresponds to the state prevailing at the time points t08, t18, and t28 shown in FIG. 18.

At a time point t1, the drive signal φV1 changes from the low level L to the middle level M. By way of example, the low level L is represented by a potential of −8 to −9 V with the middle level M being represented by a potential of 0 V. When the drive signal φV1 changes to the middle level M, the area underneath the corresponding electrode changes from the barrier state to the well state.

In FIG. 18, such state change takes place at the electrodes B1 and G1 at a time point t11 while it occurs at the electrode C1 at a time point t21, respectively.

Referring to FIG. 20B, the drive signal φV2 changes from the middle level M to the low level L at a time point t2. Upon such level change of the drive signal φV2, the area underneath the corresponding second electrode changes from the well state to the barrier state. The time point t2 shown in FIG. 20B corresponds to the time points t12, t22, . . . , shown in FIG. 18.

At a time point t3 shown in FIG. 20B, the drive signal φV3 changes from the low level L to the middle level M. Upon such level change of the drive signal φV3, the area underneath the corresponding third electrode changes from the barrier state to the well state. The time point t3 shown in FIG. 20B corresponds to the time points t13, t23, . . . , shown in FIG. 18.

At a time point t4 shown in FIG. 20B, the drive signal φV1 changes from the middle level M to the low level L. Upon such level change of the drive signal φV1, the area underneath the corresponding first electrode changes from the well state to the barrier state. This state corresponds to the time points t14, t24, . . . , shown in FIG. 18.

Referring to FIG. 20B, the drive signal φV2 changes from the low level L to the middle level M at a time point t5. Therefore, the area underneath the corresponding second electrode changes from the barrier state to the well state. This state corresponds to the time points t15, t25, . . . , shown in FIG. 18.

At a time point t6 shown in FIG. 20B, the drive signal φV4 changes from the middle level M to the low level L. The area under the corresponding fourth electrode changes from the well state to the barrier state. Such level change occurs at the time points t16, t26, . . . , shown in FIG. 18.

At a time point t7 shown in FIG. 20B, the drive signal φV3 changes from the middle level M to the low level L. The area under the corresponding third electrode changes from the well state to the barrier state. Such level change occurs at the time points t17, t27, . . . , shown in FIG. 18.

Now at a time point t8 shown in FIG. 20B, the same state as the one at the first-mentioned time point t8 is realized. More specifically, the wells and the barriers are alternatively formed in the vertical CCD (or vertical charge transfer path). During a period corresponding to one cycle from the time point t1 to t8, the vacant packets placed in the vertical CCD move by two rows, respectively.

Parenthetically, it is to be mentioned that such control signals as mentioned above are applied only to the unit driver stage in which the vacant packet to be moved is present. The other unit electrode sets are maintained in the stationary state holding the electric charges. By way of example, the middle level potential is applied to the area underneath the electrode 3 at which an electric charge is stored while the low level potential is applied to the area underneath the electrode 4 at which no electric charge is stored but a barrier is formed.

With the arrangement described above, it is possible to distribute and transfer the vacant packets within the vertical CCD at a sufficiently high speed, e.g. several ten times as fast as the charge transfer speed from the vertical CCDs to the horizontal CCD. Thus, even the electric charges stored in the upper section of the vertical CCD (or vertical charge transfer path) can change their positions quickly. To say in another way, the electric charges do not stay at the same areas but they change their positions rather rapidly from one to another. Consequently, generation of dark current can be suppressed while preventing generation of a fixed pattern (white defect).

In the case of the solid-state image pickup device described above, every time the vacant packet transferred first from the horizontal CCD to the vertical CCD moves over a predetermined distance within the vertical CCD, the charge transfer is performed in the horizontal CCD. The electric charges stored in the vertical CCD at its upper section remote from the horizontal CCD (or horizontal charge transfer path) are held at the same areas until the vacant packet transferred first reaches the upper section. During the period in which the vacant packet moves upwardly in the vertical CCD, the horizontal electric charge transfer is carried out several times.

Figure 21:
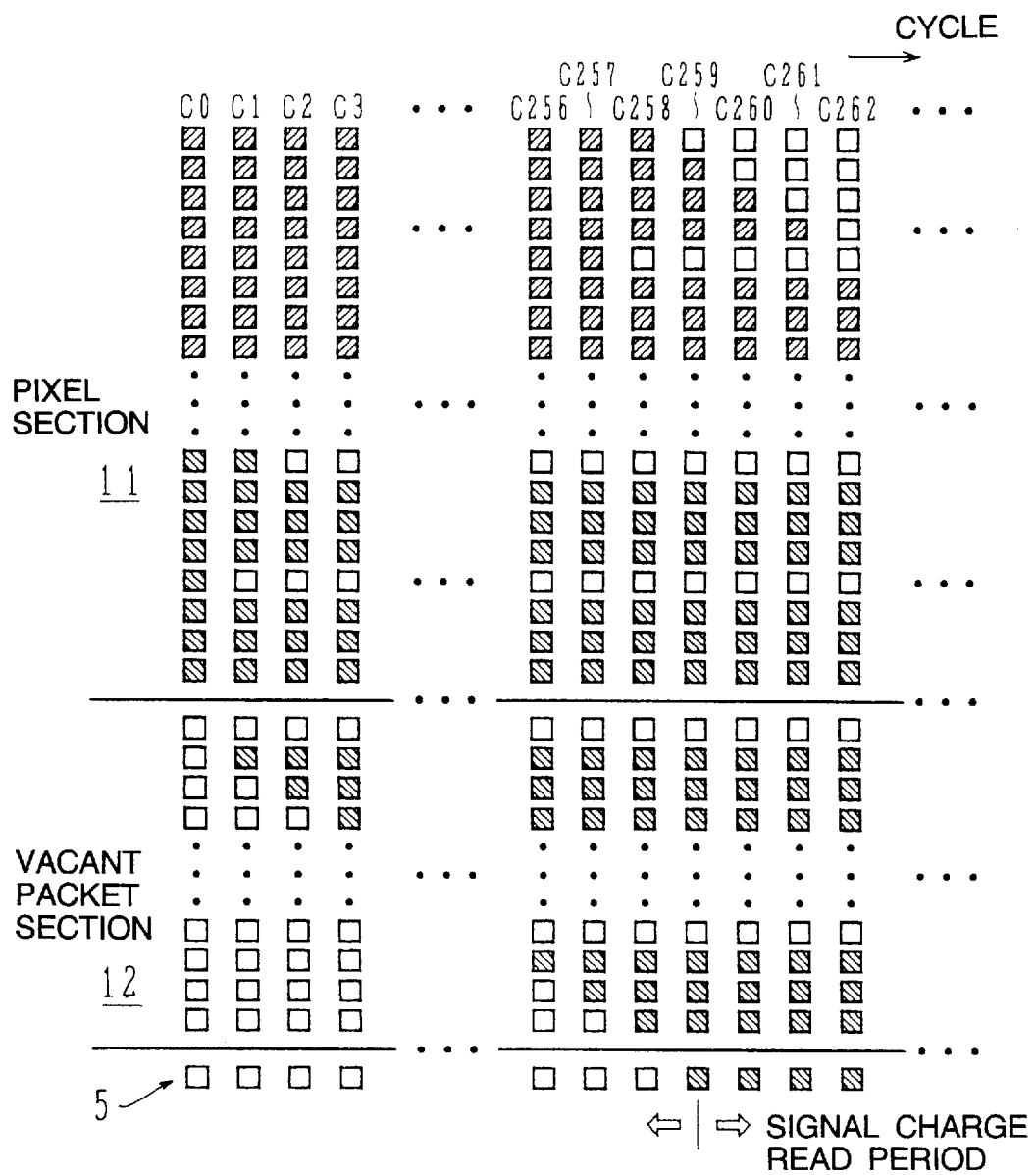
FIG. 21 is a schematic diagram showing another structure of a solid-state image pickup device proposed previously.

FIG. 21 shows another structure of the solid-state image pickup device which is capable of distributing and transferring the vacant packets more quickly over the whole area of the vertical CCDs in precedence to the intrinsic driving operation by providing a vacant packet section in the vertical CCDs in addition to a pixel section, wherein the transfer electrodes of the vacant packet section are connected directly to the transfer pulse electrodes. Thus, the transfer rate in the vacant packet section can be increased when compared with that of the pixel section. Parenthetically, in FIG. 21, one column of the vertical CCD (or vertical charge transfer path) and the horizontal CCD is shown vertically while time lapse is taken along the abscissa.

The vertical CCD has a pixel section 11 with the number of rows corresponding to that of the photodiodes in one column, and an empty packet section 12 with the number of rows not corresponding to the number of photodiodes. In the case of this device, it is contemplated to distribute the vacant packets at every fourth row.

With the distribution of one packet per four rows, assuming that the pixel section 11 has 1036 rows, downward overflowing of the electric charges corresponding to 259 rows takes place from the pixel section 11. Accordingly, if these overflown electric charges are to be accommodated with the vacant packet distribution of one vacant packet per four rows, it is necessary for the vacant packet section 12 to have 344 rows or 345 rows. In this conjunction, the uncertainty of one row results from adjustment of unit length for the vacant packet distribution at the end of the vertical CCD.

Now, referring to FIG. 21, in a cycle C0, electric charges are fetched from all the photodiodes by the vertical CCD. In this state, all the rows of the pixel section 11 of vertical CCD store the electric charges. Parenthetically, each row has two electrodes. In FIG. 21, however, only the electrodes which are associated with the photodiodes are shown.

In a cycle C1, a vacant packet is sent from the vacant packet section 12 to the pixel section 11 of the vertical CCD. In the case of this solid-state image pickup device, it is assumed that the vacant packet shifts on a four-by-four row basis during one cycle. In the succeeding cycles C2 and C3, additional vacant packets are sent to the pixel section 11 to be positioned at the fourth, eighth and twelfth rows, respectively, as counted from the bottom of the pixel section 11.

In this way, the vacant packets are sequentially sent to the vertical CCD (or vertical charge transfer path). Assuming that vacant packet section 12 has 344 rows, the electric charges transferred from the pixel section 11 to the vacant packet section 12 reach the bottom row of the vacant packet section 12 in the cycle C258.

When another vacant packet is sent to the vertical CCD in a succeeding cycle C259, the electric charge overflown from the vertical CCD is transferred to the horizontal CCD. At this time point, the electric charges transferred to the horizontal CCD 5 are shifted in the horizontal direction to be read out as the picture data corresponding to one row.

In subsequent cycles C260, C261, . . . , the vacant packets generated upon picture data transfer from the horizontal CCD (or horizontal charge transfer path) are sequentially sent to the vacant packet section 12 of the vertical CCD 2, whereby the electric charges are transferred to the horizontal CCD on a one-by-one row basis to be ultimately transferred in the horizontal direction as the image or picture data signals.

In the case of the solid-state image pickup device now under discussion, a process of distributing the vacant packets in the vertical CCD is performed during a vertical blanking period VBLK, while a process of reading picture data signals of each row is performed during a succeeding horizontal scan period. Since the charge transfer in the vertical CCD is performed on a four-by-four-rows basis, eight-phase drive signals may be employed.

In the solid-state image pickup device shown in FIG. 21, as large a vacant packet section as 345 rows is required, giving rise to a disadvantage that the chip size increases correspondingly.

FIG. 22 shows another charge transfer scheme. In FIG. 22, the vertical CCD 2 and the horizontal CCD 5 of one column are shown along the ordinate with the time lapse being taken along the abscissa.

According to the charge transfer scheme illustrated in FIG. 22, the vacant packets are fed to the vertical CCDs in the similar manner to the case described hereinbefore by reference to FIG. 17A. In the vertical CCD 2, there are provided a pixel section 11 and additionally a vacant packet section 12 for the purpose of storing the electric charges overflown from the pixel section 11, as with the case of the device described previously by reference to FIG. 21.

Thus, the charge transfer in the horizontal CCD is rendered unnecessary until all the twelve rows of the vacant packet section are filled with the electric charges from the pixel section, which in turn means that the vacant packets can be transferred to the top of vertical CCD (or vertical charge transfer path) within a shorter time as compared with the arrangement shown in FIG. 17A.

Figure 9A:
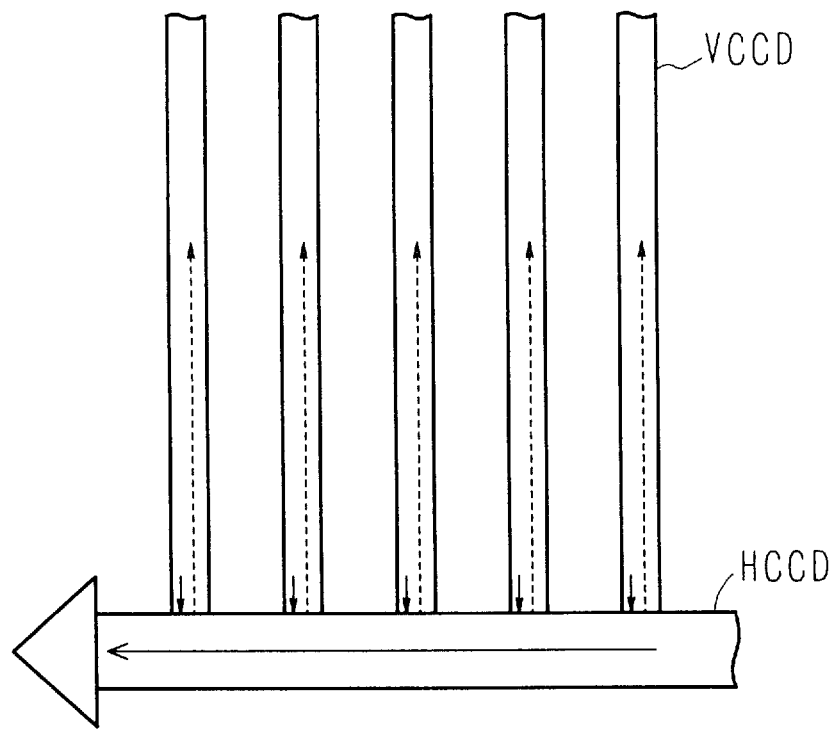
FIG. 9A and 9B are schematic views for illustrating a problem in a solid-state image pickup device of vacant packet transfer type and a horizontal period, respectively.
Figure 9B:
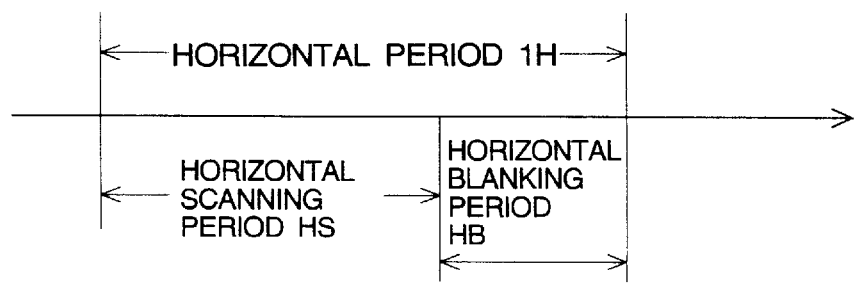
Figure 10:
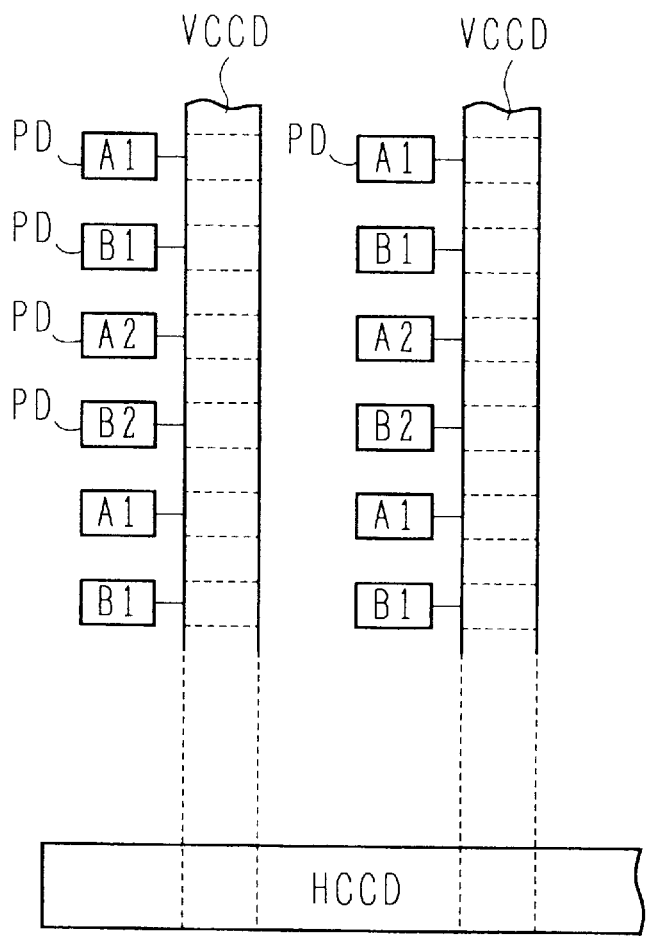
FIG. 10 shows only schematically a structure of an interline-type solid-state image pickup device.

FIG. 9A and 9B are views for illustrating charge transfer in vertical CCDs (vertical charge transfer paths) and a horizontal CCD (horizontal charge transfer path). More specifically, FIG. 9A shows a relation between the vertical CCDs VCCD and the horizontal CCD HCCD. Referring to the figure, after the electric charges corresponding to one row have been transferred from the vertical CCDs, these electric charges are transferred serially through the horizontal CCD. In this conjunction, it should be noted that, if the charge transfer is performed during a period in which the electric charges are serially transferred through the horizontal CCD, noise will be admixed into the signal read out from the device. Accordingly, the charge transfers from the vertical CCDs are not allowed so long as the electric charges are transferred through the horizontal CCD.

Under the circumstances, one horizontal period H is divided into a horizontal scanning period HS and a horizontal blanking period HB, wherein the charge transfer through the horizontal CCD is effectuated during the horizontal scanning period HS with the charge transfers from the vertical CCDs being effected during the horizontal blanking period HB.

On the other hand, the vacant packets are transferred in the direction opposite to that of the charge transfer, as indicated by phantom line in FIG. 9A. When the length of the vacant packets to be transferred during a single horizontal period is to be increased, the horizontal blanking period HB is required to have a sufficient time duration for allowing the above-mentioned vacant packet transfer. On the other hand, a sufficient time duration must be secured for the horizontal scanning period HS to transfer a predetermined amount of electric charge.

In order to allow the vacant packets to reach the top of the vertical CCD (or vertical charge transfer path) as fast as possible, the distance over which the vacant packet is transferred during a single horizontal period should preferably be increased. In that case, however, the duration of one horizontal period (i.e., 1 H) will be lengthened so far as the same timing signal is employed. Then, the electric charge located at the top of the vertical CCD can be shifted as early as desired and white defects can be reduced, which result in that the time taken for reading out all the electric charges is lengthened in proportion to the increasing of the single horizontal period (1 H). It goes without saying that the variation or difference in the dark current becomes more significant as the time taken for reading out all the electric charges increases.

In order to reduce the difference in the dark current, it is desirable to shorten the time duration of the horizontal period. In that case, however, the duration of the one horizontal blanking period HB becomes necessarily shorter, which in turn means that the distance or length over which the vacant packets can be transferred through the vertical CCDs during one horizontal period (1 H) becomes shorter. Then, a lot of time is involved before the electric charge located at the top of the vertical CCD can be driven, incurring unwantedly increasing of the white defect.

With a view to solving the problems described above, it is taught by the present invention to provide a method of optimizing the transfer of the vacant packets by providing a vacant packet section and making a different row interval for the vacant packet transfer between a step of dispersing or distributing the vacant packets in the pixel section 11 and a transfer step for reading out signal charges from the horizontal CCD (or horizontal charge transfer path).

Now, the present invention will be described in conjunction with exemplary embodiment thereof. FIG. 1 shows only schematically structure of a solid-state image pickup device according to a first embodiment of the present invention. Incidentally, in FIG. 1, those parts which are the same as or equivalent to those of the solid-state image pickup device described above are denoted by like reference characters. As can be seen in FIG. 1, photodiodes PD are arrayed in a matrix-like geometry and serve as photoelectric conversion elements. Disposed as coupled to each column of the photodiodes is a vertical CCD (or vertical charge transfer path) VCCD. Each of the vertical CCDs is composed of a pixel section 11 provided in association with corresponding photodiodes PD and a vacant packet section 12 extending externally of the photoelectric conversion element section.

Bottom ends of the vertical CCD (i.e., bottom end of the vacant packet section 12) are connected to the horizontal CCD HCCD. It is assumed, only by way of example, that the matrix-like array of the photodiodes PD includes 1280 pixels in the horizontal direction (i.e., in the rowwise direction) and 1024 pixels in the vertical direction (i.e., in the columnwise direction). Furthermore, it is assumed that 1280 vacant packets are disposed in the horizontal direction (rowwise direction) while 26 vacant packets are arrayed in the vertical direction (columnwise direction).

For controlling the photodiodes and the vertical CCDs, there are provided a read pulse control circuit 17, a transfer pulse control circuit 18, a shift register 19 and a control circuit 20. The read pulse control circuit 17 is supplied with a voltage TG which is required for transferring the electric charges from the photodiodes to the vertical charge transfer path (vertical CCD). On the other hand, the transfer pulse control circuit 18 is supplied with signals V1, V2, V3 and V4 and additionally with signals INV, BAW and STP for forming potential wells and potential barriers in the areas which are not supplied with the drive pulse. Further, the shift register 19 is supplied with signals φA, φB, φIN and φSRL for shifting sequentially the drive area of the vertical CCD. The control circuit 20 is in charge of controlling the solid-state image pickup device as a whole.

Figure 2:
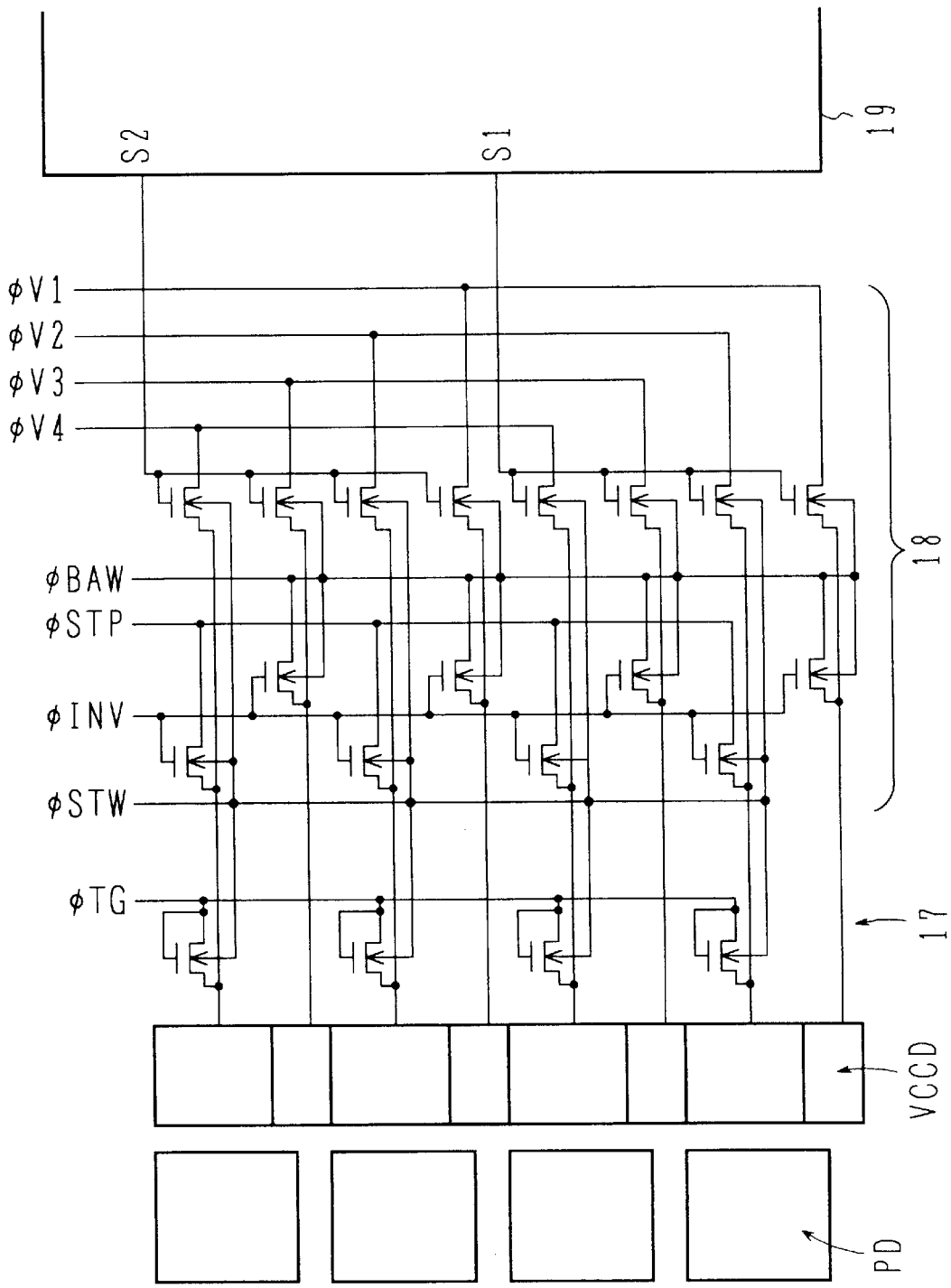
FIG. 2 is a circuit diagram showing more concretely a configuration of a circuit shown in FIG. 1.

FIG. 2 shows in more concrete the circuit configurations of the read pulse control circuit 17 and the transfer pulse control circuit 18 of the solid-state image pickup device shown in FIG. 1. Structures and interconnections of the photodiodes PD and the vertical CCD VCCD are basically identically with those shown in FIG. 17. The shift register 19 generates a shift signal S for shifting sequential the areas of the vertical CCD to be driven. During a period in which the shift signal S1 is generated, only the transfer electrodes of the vertical CCDs VCCD corresponding to the first and second rows, respectively, are driven. Similarly, when the shift signal S2 is generated, only the transfer electrodes of the vertical CCDs VCCD corresponding to the third and fourth rows, respectively, are driven. During a period in which no shift signal S1 outputted, a shift inhibit signal is outputted.

In the areas to which the shift inhibit signal is supplied, the charge transfer through the vertical CCD is not performed. A signal φINV is supplied for holding the electric charge during a period in which the charge transfer is not effected in the vertical direction. In response to application of the shift signal S, the transistors of the rightmost column of the transfer pulse control circuit 18 are turned on to supply the drive signals φV1, φV2, φV3 and φV4 to the vertical CCDs. During a period in which the shift inhibit signal is not applied, the transistors provided in two columns at the left-hand side of the transfer pulse control circuit 18 as viewed in the figure are turned on, whereby a storage voltage STP (i.e., the middle-level voltage mentioned hereinbefore) is supplied to the electrodes of the vertical CCDs under which the electric charges are stored, while a barrier voltage BAW (i.e., the low-level voltage mentioned hereinbefore) is supplied to those electrodes of the individual vertical CCDs which form barriers, respectively. Further, upon transfer of the electric charge from the photodiodes PD to the vertical CCDs VCCD, a read signal φTG is supplied by way of the read pulse control circuit 17.

The horizontal CCD shown in FIG. 1 is supplied with two-phase drive signals φH1 and φH2. The signal charges are read out from the output of the horizontal CCD by way of an output amplifier. A reset signal φRS serves for resetting the output amplifier upon every read-out of the signal.

Figure 3:
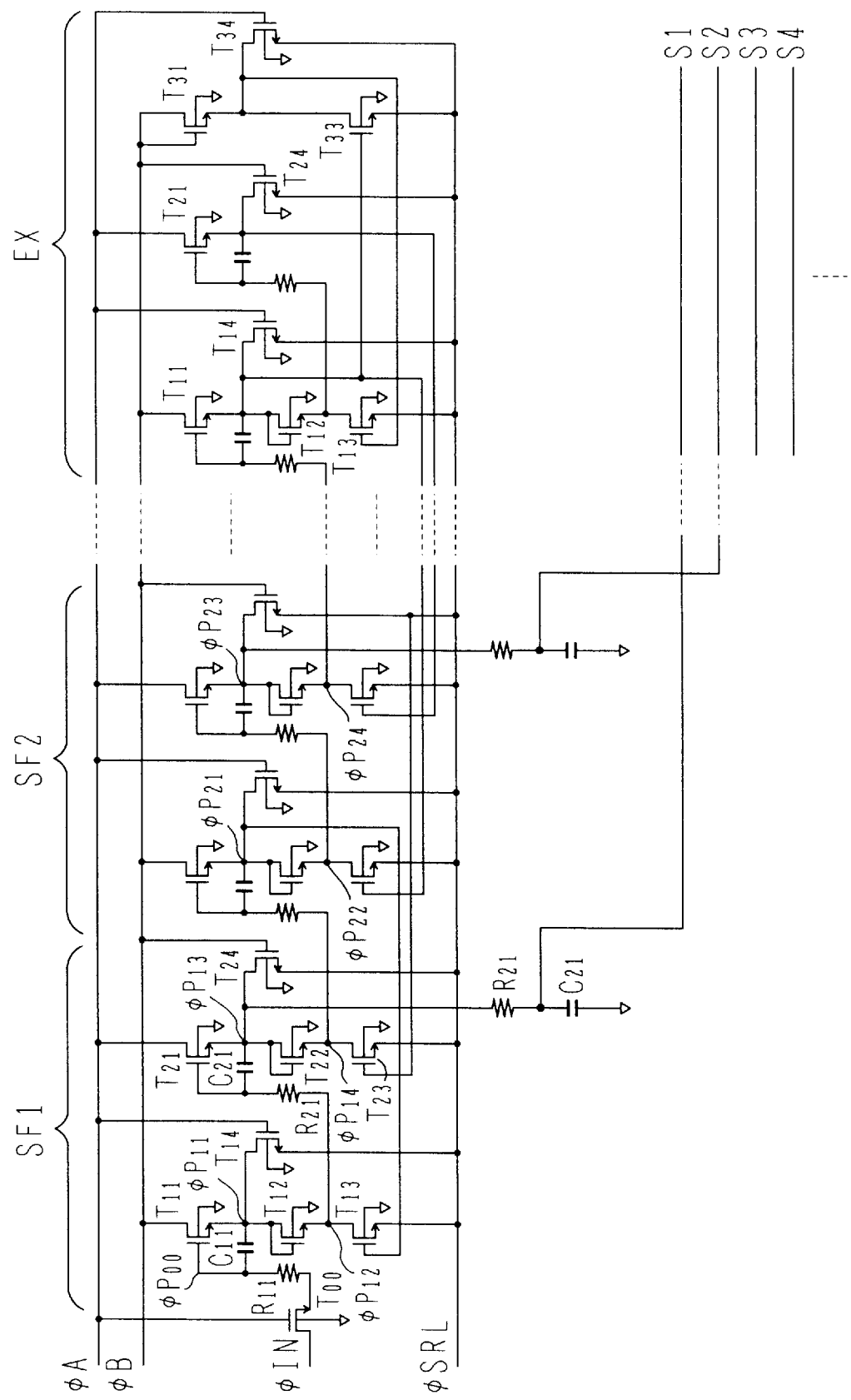
FIG. 3 is a circuit diagram showing in concrete a circuit configuration of a shift register employed in the device shown in FIG. 1.

FIG. 3 is a circuit diagram showing in more concrete a circuit configuration of the shift register 19 shown in FIG. 1. As can be seen in FIG. 3, the shift register 19 is composed of a plurality of shift stages SF1, SF2, ... interconnected in series and terminated in an end stage EX. The individual shift stages are implemented in an identical structure. Accordingly, the following description will be directed to the circuit configuration of the first shift stage SF1 as the representative of the other shift stages.

As is shown in FIG. 3, a series circuit of n-type MOS transistors T11, T12 and T13 is interposed between a signal line for the control signal φB and a signal line for control signal φSRL. A bootstrap capacitor C1 is connected between a gate electrode (contact) of n-type MOS transistor T11 and a source electrode thereof. A gate electrode and a drain electrode of the transistor T12 are mutually connected, wherein the drain electrode or contact is connected to the drain electrode of an n-type MOS transistor T14 which has a source electrode or contact connected to a signal line for the control signal φSRL and a gate electrode or contact connected to a signal line for the control signal φA.

Furthermore, a circuit identical with the circuit comprised of the n-type MOS transistors T11, T12, T13 and T14 and the capacitor C11, is constituted by n-type MOS transistors T21, T22, T23 and T24 and a capacitor C21, wherein a drain electrode of the n-type MOS transistor T13 is connected to the gate electrode of the n-type MOS transistor T21 by way of a register R21. It should however be noted that the connections for the signals φA and φB are reversed.

One end of a resistor R11 is connected to the gate electrode of the n-type MOS transistor T11, while the other end of the former constitutes an input point of the shift stage SF1 whose output point is constituted by the drain electrode of the n-type MOS transistor T23. There are provided a plurality of shift stages each implemented in the structure described above, wherein the output point of the preceding shift register is connected to the input point of the succeeding one.

The input point of the shift stage SF1 is supplied with an input signal φIN via an n-type MOS transistor T00 which has a gate electrode connected to a signal line for the control signal φA. Thus, only when the control signal φA is at high level, the input signal φIN is supplied to the shift stage SF1.

The gate electrodes of the n-type MOS transistors T13 and T23 of each shift stage are connected to source electrodes of the n-type MOS transistors T11 and T21 of the succeeding shift stage, respectively. In each shift stage SFn, the source electrode of the n-type MOS transistor T21 is connected to the ground potential via a series circuit of a resistor R21 and a capacitor C21, wherein a junction between the resistor R21 and the capacitor C21 serves as an output terminal for a shift signal Sn.

Since the end or final shift stage EX has no succeeding stage to which the signal of the final shift stage EX is to be supplied, no interconnection is made between the n-type MOS transistors T22 and T23. Besides, in the final shift stage EX having no succeeding shift stage, the circuit for generating a signal to be supplied to the gate electrode of the n-type MOS transistor T13 is constituted by the n-type MOS transistors T31, T33 and T34 which correspond to n-type MOS transistors T11, T13 and T14, respectively, of the succeeding shift stage. It should however to be noted that in the final shift stage EX there is no transistor which corresponds to the n-type MOS transistor T12 of the succeeding shift stage. Thus, the n-type MOS transistors T31 and T33 are directly connected to each other.

The gate electrode of the n-type MOS transistor T31 is connected to the signal line for a control signal φB, while that of the n-type MOS transistor T33 is connected to the source electrode of the n-type MOS transistor T11 of the final shift stage.

Next, operation of the shift register will be described by reference to FIG. 4 which shows a timing chart for the shift register for vacant packet transfer. In the figure, control signals φIN, φA, φB and φSRL are illustrated at first to fourth lines, respectively, as countered from the top. On the other hand, illustrated at a fifth line et seq., there are illustrated potentials φP00, φP11 to φP14 and φP21 to φP24 at relevant circuit points in the shift register, respectively, wherein φP00 represents the potential at the gate electrode of the n-type MOS transistor T11.

In more general terms, φPi1 to φPi4 represent the potentials at relevant circuit points in the i-th shift stage designated generally by shift stage SFi. Thus, throughout the shift stages, φPi1 represents the potential at the source electrode of the n-type MOS transistor T11, φPi2 represents the potential at the drain electrode of the n-type MOS transistor T13, φPi3 represents the potential at the source electrode of the n-type MOS transistor T21 and φPi4 represents the potential at the drain electrode of the n-type MOS transistor T23.

Now, let's suppose that the control signals φIN and φA assume a high level at a time point u1. Then, the n-type MOS transistor T00 is turned on, as a result of which the potential φP00 becomes high.

At a time point u2, the control signal φIN becomes low. However, because the control signal φA assumes a low level in precedence to the control signal φIN and thus the n-type MOS transistor T00 is in the off-state, the potential φP00 is maintained at high level.

At a time point u3, the control signal φA becomes low when the control signal φB becomes high. At this time point, the n-type MOS transistor T11 is in the on-state (i.e., conducting state) because the potential φP00 is at high level. Thus, the potential φP11 assumes high level in synchronism with the control signal φB. As a result of this, the transistor T12 is turned on, whereby potential φP12 also becomes high.

At a time point u4, the control signal φB becomes low. Since the n-type MOS transistor T11 is in the on-state at this time point, the potential φP11 assumes low level in synchronism with the φB, as result of which the n-type MOS. transistor T12 is turned on, causing the potential φP12 to be high.

At a time point u5, the control signal φA assumes high level, in response to which the n-type MOS transistor T00 is turned on. At this time point, the control signal φIN is at low level. Consequently, the potential φP00 becomes low in synchronism with the rise-up of the control signal φA.

Furthermore, because the potential φP12 is at high level at this time point, the n-type MOS transistor T12 is in the on-state (i.e., in the conducting state). Consequently, the potential φP13 becomes high in synchronism with the rise-up of the control signal φA. The n-type MOS transistor T23 is thus turned on with the potential φP14 assuming high level.

At a time point u6, the n-type MOS transistor T21 is in the on-state. Consequently, when the control signal φA becomes low, the potential φP13 also becomes low. During a period in which the potential φP13 is at high level, the potential φP13 is divided by the resistor R21 and the capacitor C21, which results in that the shift signal S1 is outputted. In this way, in the current cycle, the shift signal S1 is outputted in synchronism with the control signal φA.

At the time point u6, the potential φP14 at the input point of the second shift stage SF2 is at high level, while all the potentials φP21 to φ24 internal of the shift stage SF2 are all at low level. This state is equivalent to that of the first shift stage SF1 at the time point u2. It is further to be mentioned that the phases of the control signals φIN, φA, φB and φSRL at the time points u2 and u6 are same. Consequently, the potentials at the various circuit points within the second shift stage SF2 in the succeeding cycle undergo similar changes as the potentials at the equivalent circuit points within the shift stage SF1 in the current cycle. In this manner, the shift signals S1, S2, . . . are sequentially outputted in synchronism with the control signal φA.

Figure 5:
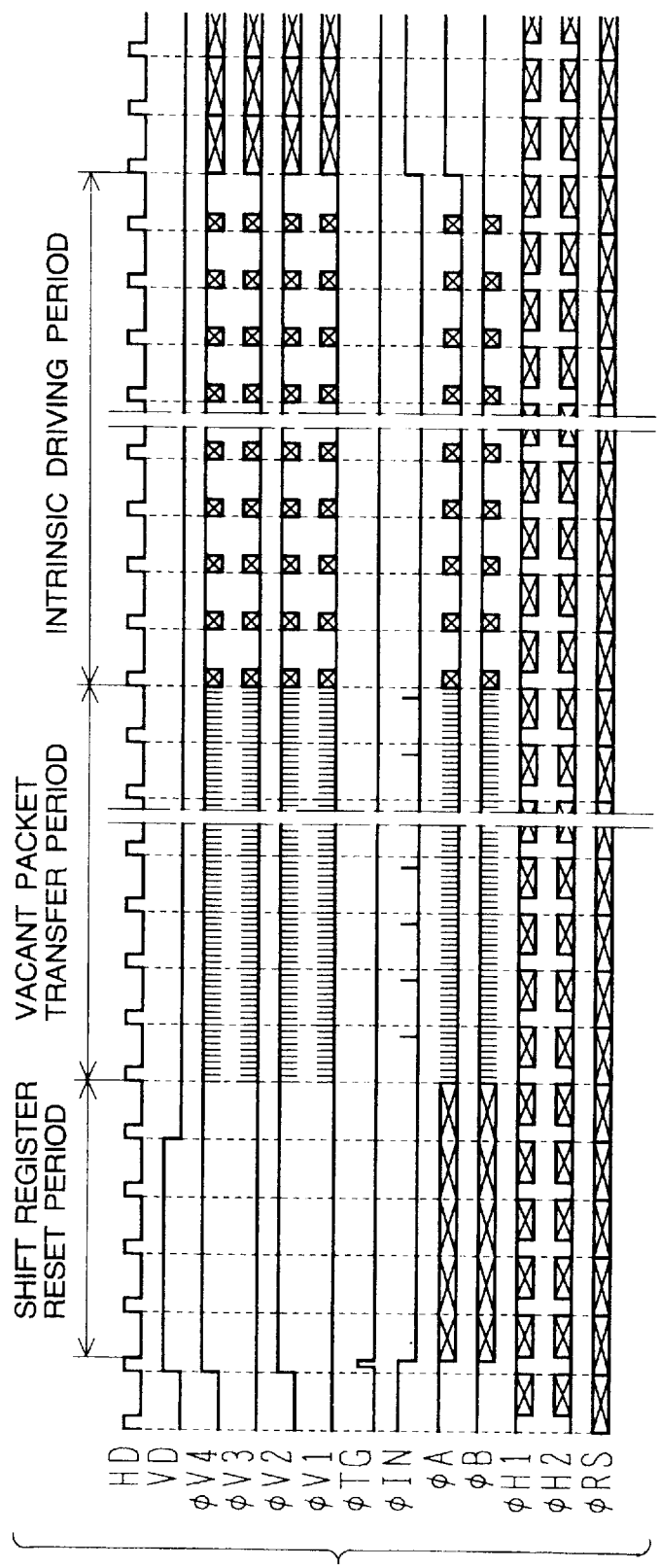
FIG. 5 is a timing chart showing control signals employed in the solid-state image pickup device shown in FIG. 1.

FIG. 5 is a timing chart showing control signals for the circuits shown in FIGS. 1 to 3. More specifically, shown in FIG. 5 are a horizontal synchronizing signal HD, a vertical synchronizing signal VD, vertical CCD drive signals φV1 to φV4 for driving the vertical CCDs, a signal charge read signal φTG for reading out picture signal from the photodiodes, control signals φIN, φA and φB for controlling transfer areas in the vertical CCD, horizontal CCD drive signals φH1 and φH2, and a reset signal φRS in this order from the top.

Upon starting of the vertical period in response to the vertical synchronizing signal VD, a shift register reset period is started with the control signals φA and φB being supplied to the shift register, whereby all stages of the shift register are initialized.

Subsequently, a vacant packet transfer period is started. During the vacant packet transfer period, the control signals φA and φB are supplied to the shift register. Every time the control signal φIN is supplied, a vacant packet is injected to the vertical CCD from the pixel section, whereupon the transfer is started. In that case, the vacant packet replaces the signal charge in the pixel section, whereby the signal charge is shifted by one row toward the horizontal CCD. The length of the vacant packet as transferred is determined by the number of pulses of the control signals φA and φB.

Accordingly, by placing one pulse of the control signal φN at every N/2-th pulse of the control signals φA and φB, the vacant packet transfer can be effected at every N-th row. During the vacant packet transfer period, the control signals φA and φB as well as the vertical CCD drive signals φV1 to φV4 are supplied throughout all the horizontal periods.

Thus, in the vertical CCD, the vacant packet transfer is carried out throughout all the horizontal period. By way of example, during the vacant packet transfer period, one row of the vacant packets may be fed to the vertical CCD during one horizontal period, whereby the vacant packets are transferred through the vertical CCD by N=40 rows. Assuming that the vacant packet section includes 26 rows, the vacant packet shifts to the 14-th row from the bottom during a first horizontal period.

As the operation mentioned above, until the vacant packet reaches the top of the vertical CCD, the vacant packet section 12 is filled with the pixel charges sifted sequentially from the pixel section 11. When the vacant packet is shifted by forty rows during one horizontal period, the vacant packets are dispersed or distributed in the pixel section 11 at every 40-th row. Assuming that the vacant packet section 12 includes twenty six rows, the topmost vacant packet reaches the eleventh row from the top during the horizontal period in which the signal charge is transferred to the bottom row of the vacant packet section.

At the end of the vacant packet transfer period, an intrinsic driving period is started. In the intrinsic driving period, the vertical CCDs are driven during only the horizontal blanking period of each horizontal period. During the remaining horizontal scanning period, the horizontal CCD drive signals φH1 and φH2 are supplied for effectuating the charge transfer in the horizontal CCD. During the horizontal blanking period, every time one control signal φIN is inputted, one row of the vacant packets are injected to the vertical CCD from the horizontal CCD to be driven by M rows (where M=8) through the vertical CCD. The topmost vacant packet shifts upwardly to the third row during a first horizontal period and reaches the topmost row during a second horizontal period.

At this juncture, it should be mentioned that in case the vacant packet section is constituted by 27 rows, the vacant packet transfer period is lengthened by one horizontal period. However, upon completion of the vacant packet transfer period, the vacant packet can reach the topmost row of the vertical CCD. Accordingly, the time taken for starting the transfer of the signal charge at the topmost end of the vertical CCD is shortened by one horizontal period.

Because the signal charges of the one row are read out during one horizontal period in the intrinsic driving period, there are required 1024 horizontal periods in order to read out the signal charges from 1024 rows.

Figure 6:
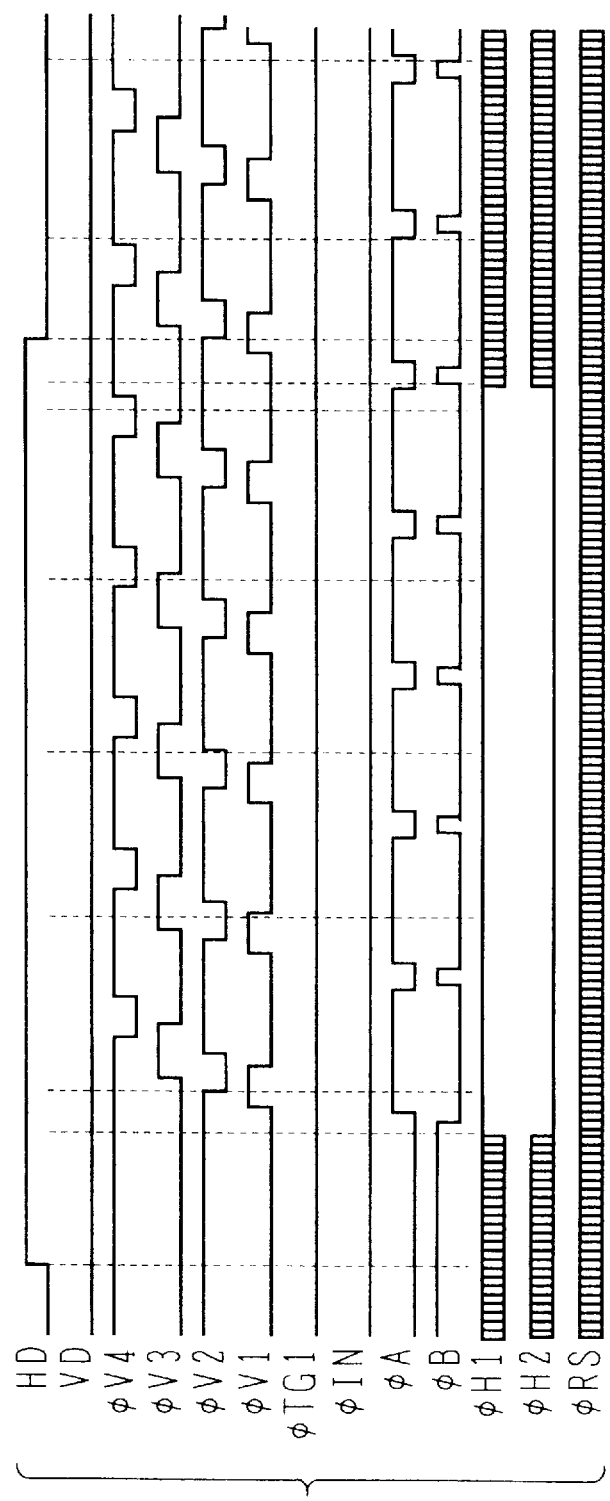
FIG. 6 is a timing chart showing control signals employed in the solid-state image pickup device shown in FIG. 1.
Figure 7:
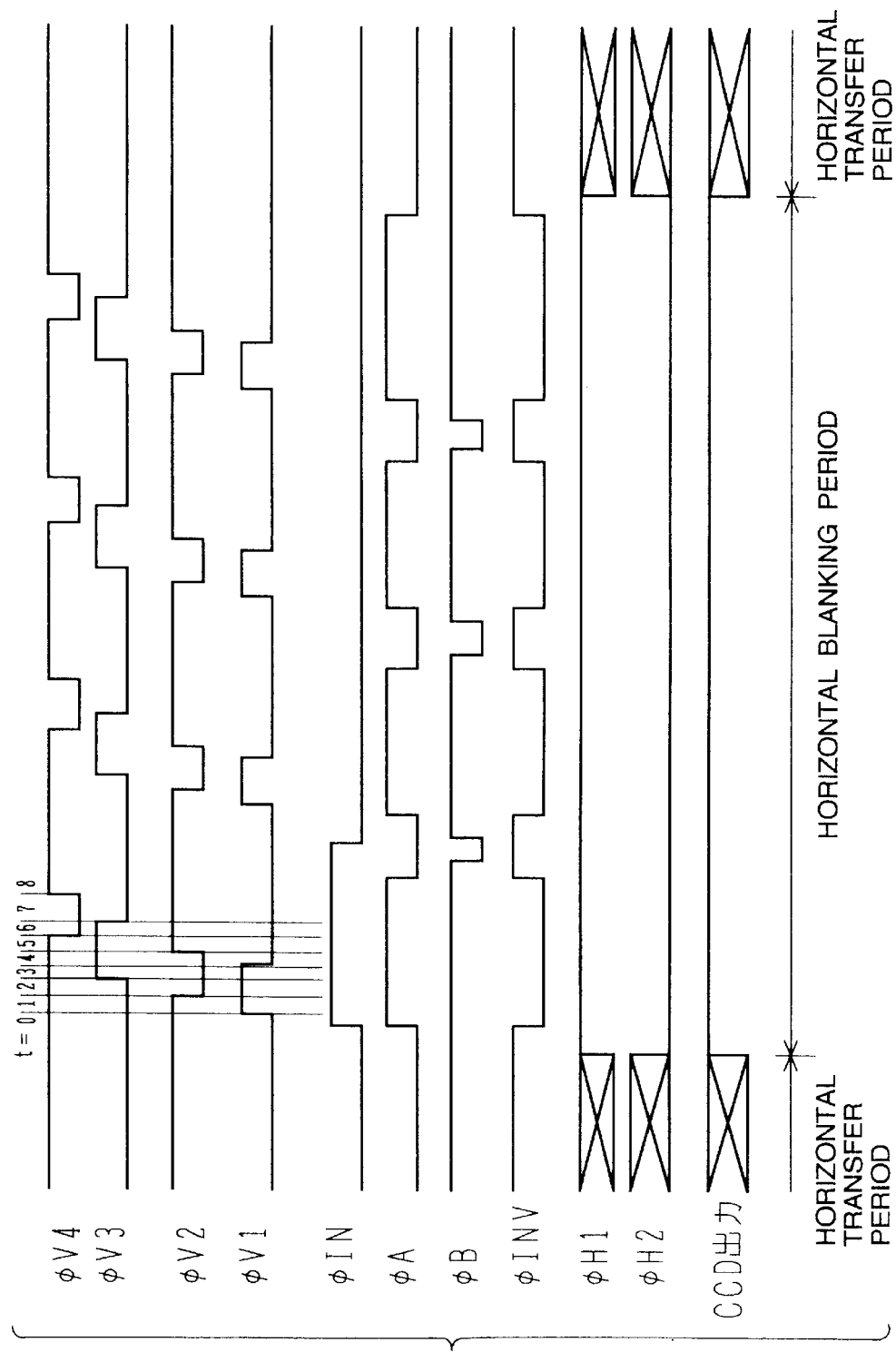
FIG. 7 is a timing chart showing control signals employed in the solid-state image pickup device shown in FIG. 1.

FIGS. 6 and 7 show in detail signal waveforms in the vacant packet transfer period and the intrinsic driving period.

Figure 8:
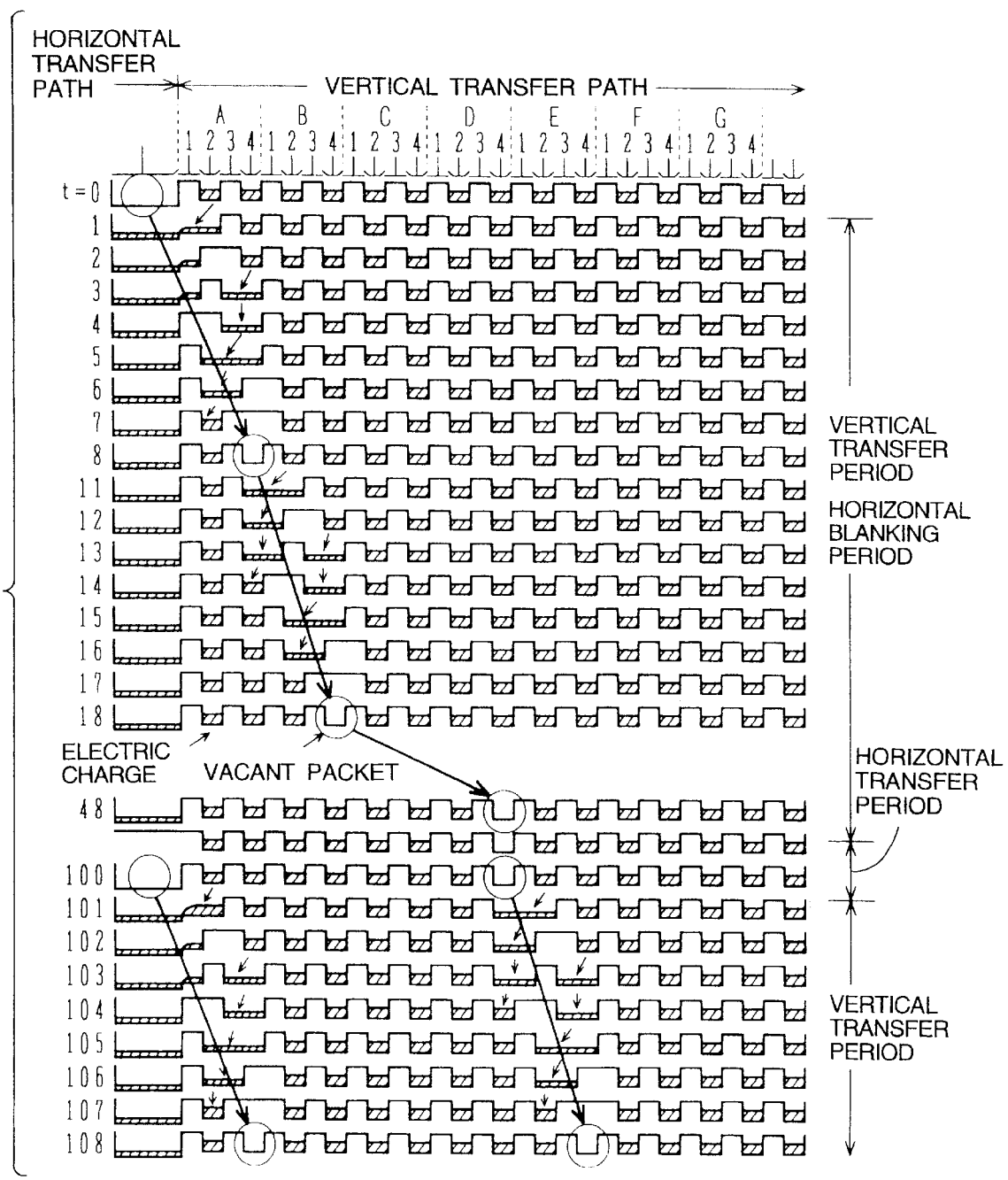
FIG. 8 is a schematic diagram for illustrating in what manner signal charges are transferred in the solid-state image pickup device shown in FIG. 1.

FIG. 8 is a schematic diagram for illustrating in what manner the picture or signal charges are transferred in the intrinsic driving period. In the figure, one column of the horizontal CCD and the vertical CCD is taken along the abscissa with a time lapse being taken along the ordinate. Four transfer electrodes for two rows constitute a unit driver stage which is attached by the shift signal S for performing the charge driving operation. During the horizontal blanking period (vertical transfer period), the activated area of the vertical CCD is shifted sequentially as a result of which the vacant packet is transferred from the left to the right, as viewed in the figure. During the horizontal transfer period, the charge transfer through the vertical CCD is stopped and the charge transfer through the horizontal CCD is carried out. When the vertical transfer period is started again, the charge transfer in the vertical CCD is performed.

According to the teaching of the present invention incorporated in the instant embodiment thereof, the vacant packets are distributed into the pixel section 11 by making use of all the horizontal periods in the vacant packet transfer period after the electric charges have been read out from the photodiodes PD to the vertical CCD. The signal charges driven out from the pixel section 11 are accommodated within the vacant packet section 12. Accordingly, until the vacant packet section 12 has fully been filled with the electric charges, no electric charge is fed to the horizontal CCD. Thus, no signal is outputted from the horizontal CCD regardless of supply of the horizontal drive control signal φH. Thus, there arises no problem even when the charge transfer is performed for the vertical CCD by making use of all the horizontal periods.

In the following description, it is assumed that in the vacant packet transfer period, the vacant packet is transferred by twenty unit driver stages (i.e., by 40 rows) during one horizontal period while in the intrinsic transfer period, the vacant packet is transferred by four unit driver stages (i.e., 8 rows). Further, assuming that a unit period $f_H$ is about 70 nsec, there are required 88 unit periods for driving one signal unit driver stage (i.e., 2 rows) of the vertical CCD.

Transfer of one pixel charge through the horizontal CCD requires one unit period (i.e., 1 $f_H$). Assuming that one horizontal period (1 H) includes 1820 unit periods (i.e., 1820 $f_H$), the vacant packet is transferred by 20 unit driver stages (40 rows) by making use of 1760 unit period (i.e., 1760 $f_H$) during the vacant packet transfer period. Then, the vacant packet transfer period T1 is given by $T1 = 1820 f_H \times 26$.

Furthermore, it is assumed that in the intrinsic transfer period, the electric charge is transferred by four unit driver stages (by 8 rows) in the vertical CCD during the horizontal blanking period. Since the number of the pixels in the horizontal direction is assumed to be 1280, a time corresponding to 1280 unit periods (i.e., 1280 $f_H$) is required for driving the horizontal CCD. Accordingly, the time required for the driving amounts to $(1280+88\times4)f_H$ in total, which can well be accommodated within one horizontal period of 1820 $f_H$.

The pixel charges are resident at 1024 rows. The time T2 required for reading out all these pixel charges is given by $T2 = 1820 f_H \times 1024.$ Accordingly, the time taken for reading all the pixels of one frame is determined as follows.

1 frame=$T1+T2=1,911,000 f_H$

For the purpose of comparison, let's assume a case in which the vacant packet transfer as well as vacant packet distribution and the intrinsic charge transfer are performed only during the horizontal blanking period. If the vacant packet is to be transferred by 20 unit driver stages (i.e., by 40 rows) during the horizontal blanking period, duration of one horizontal period (1 H) amounts to 3040 $f_H$, which means that the time of one frame is 3,192,000 $f_H$.

Thus, comparison with the case assumed above shows that the frame period in the case of the instant embodiment of the invention is shorter than the assumed case by a factor of about 0.6. Besides, because the time required for reading out the whole frame is decreased by a factor of about 0.6, the difference in the dark current can be reduced by a factor of about 0.6 when compared with the assumed case.

In the assumed case for comparison mentioned above, the vacant packet is transferred by 20 unit driver stages (40 rows) during one horizontal period. Accordingly, although the number of the horizontal periods taken for the vacant packet to reach the top end of the vertical CCD is same as in the case of the instant embodiment of the invention, the duration of one horizontal period (1 H) is lengthened to 3040 $f_H$. Consequently, the time required for starting the shift of the electric charge at the top end or row of vertical CCD increases correspondingly.

Furthermore, in the case of the solid-state image pickup device where no vacant packet section is provided, as shown in FIG. 19, the vacant packet transfer is performed during only the horizontal blanking period. In this conjunction, when it is assumed that the vacant packet is transferred by four unit driver stages during one horizontal blanking period, the maximum resident time of the electric charge at the top of the vertical CCD will amount to about 17 ms, giving rise to generation of white defect of a high level on the order of 25 mV (at 50° C.). The time taken for reading out the signal charges from all the pixels is about 134 ms, which provides an indicator of the difference in the dark current.

By contrast, in the solid-state image pickup device according to the instant embodiment of the invention, the maximum resident time of the electric charge at the top of the vertical CCD is as short as about 3 ms, which means that the level of the white defect is about 5 mV which is significantly low when compared with 25 mV in the solid-state image pickup device disclosed in the preceding application mentioned hereinbefore. Further, the time taken for reading out the signal charges from all the pixels is about 138 ms which may be regarded as substantially equal to the pixel reading time in the assumed case.

As will now be apparent from the foregoing description, according to the teachings of the invention incorporated into the illustrated embodiment, the white defect can be suppressed to a negligible level with the difference or variance in the dark current being suppressed to a relatively low level.

Next, description will be directed to an image pickup method carried out by using the solid-state image pickup device shown in FIG. 1, being however understood that the image pickup method may equally be adopted in the solid-state image pickup device shown in FIG. 19.

Figure 11:
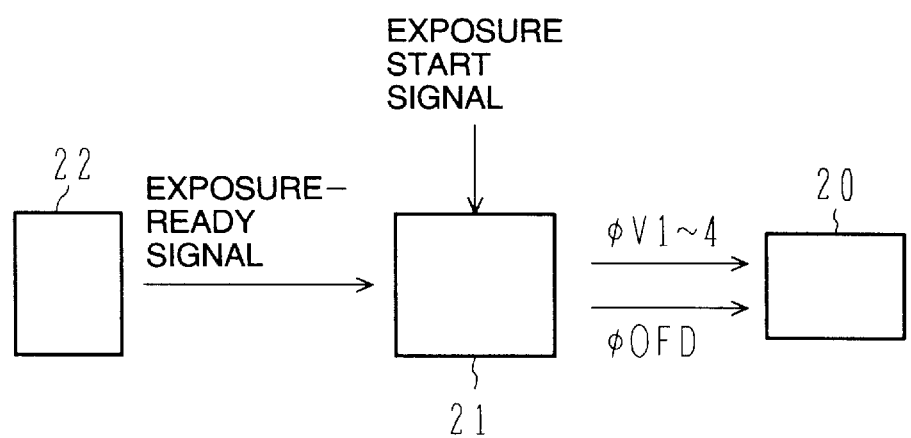
FIG. 11 is a block diagram showing only schematically a structure of a camera incorporating the solid-state image pickup device shown in FIG. 1.

FIG. 11 is a diagram showing only schematically a camera incorporating a solid-state image pickup device shown in FIG. 1 or FIG. 19. Supplied to the image pickup system 20 from a drive timing signal generator 21 are vertical CCD drive signals φV1 to φV4 and a substrate sink control signal φOFD for draining the electric charges stored at the photodiodes to a substrate.

Let's assume, by way of example, of the solid-state image pickup device is formed within a p-type well in an n-type silicon substrate surface. In that case, when the substrate sink control signal φOFD is supplied, a high-voltage pulse is applied to the n-type substrate with a polarity of reverse bias to the p-type well. As a result of this, the potential barrier of the p-type well area makes disappearance, which allows the electric charge stored at the associated photodiode to flow to the n-type substrate. In this manner, by supplying the substrate sink control signal φOFD to the solid-state image pickup device, the electric charges stored at the photodiodes are purged therefrom to the substrate.

The drive timing signal generator 21 is supplied with an exposure-ready signal from a microcomputer 22 incorporated in the camera. The exposure-ready signal can be generated in synchronism with depression of a shutter release button. Further, the drive timing signal generator 21 is supplied with an exposure start signal from other device incorporated in the camera. The exposure start signal may be generated in synchronism with light emission from strobe lamp.

Figure 12:
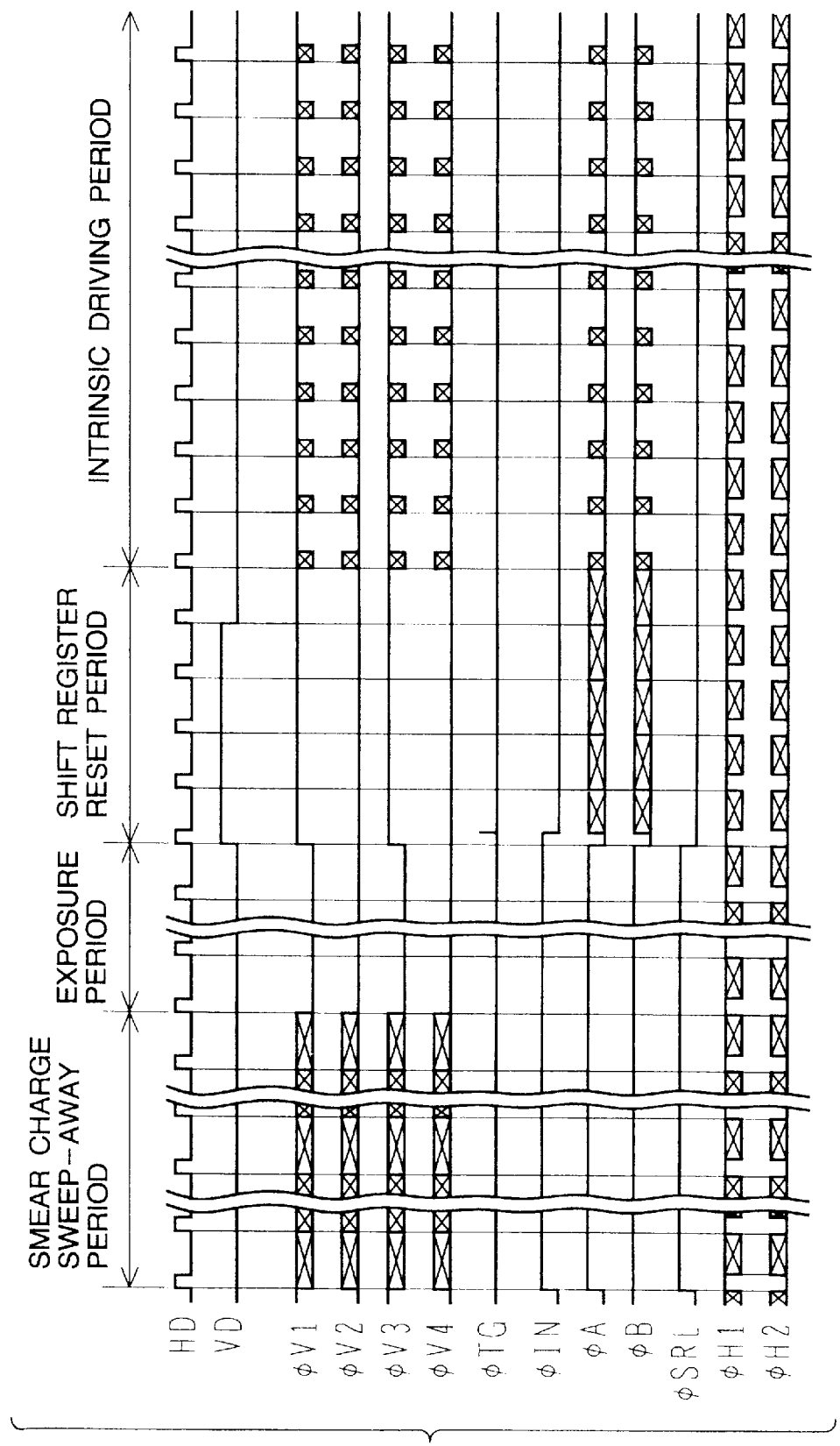
FIG. 12 is a timing chart showing major signals generated in the course of image pickup process preformed by using solid-state image pickup devices shown in FIGS. 1 and 19.

FIG. 12 is a timing chart showing major signals generated during the course of image pickup process. More specifically, shown in FIG. 12 are a horizontal synchronizing signal HD, a vertical synchronizing signal VD, vertical CCD drive signals φV1 to φV4 for driving the vertical CCDS, a signal charge read signal φTG for reading out signal charges from the photodiodes, control signals φIN, φA, φB and φSRL supplied to the shift register, horizontal CCD drive signals φH1 and φH2 in this order, as viewed from the top of the chart.

The image pickup process is comprised of a smear sweep-away step (or period), an exposure step (or period), a shift register reset step (or period) and an intrinsic driving step (or period).

Figure 13:
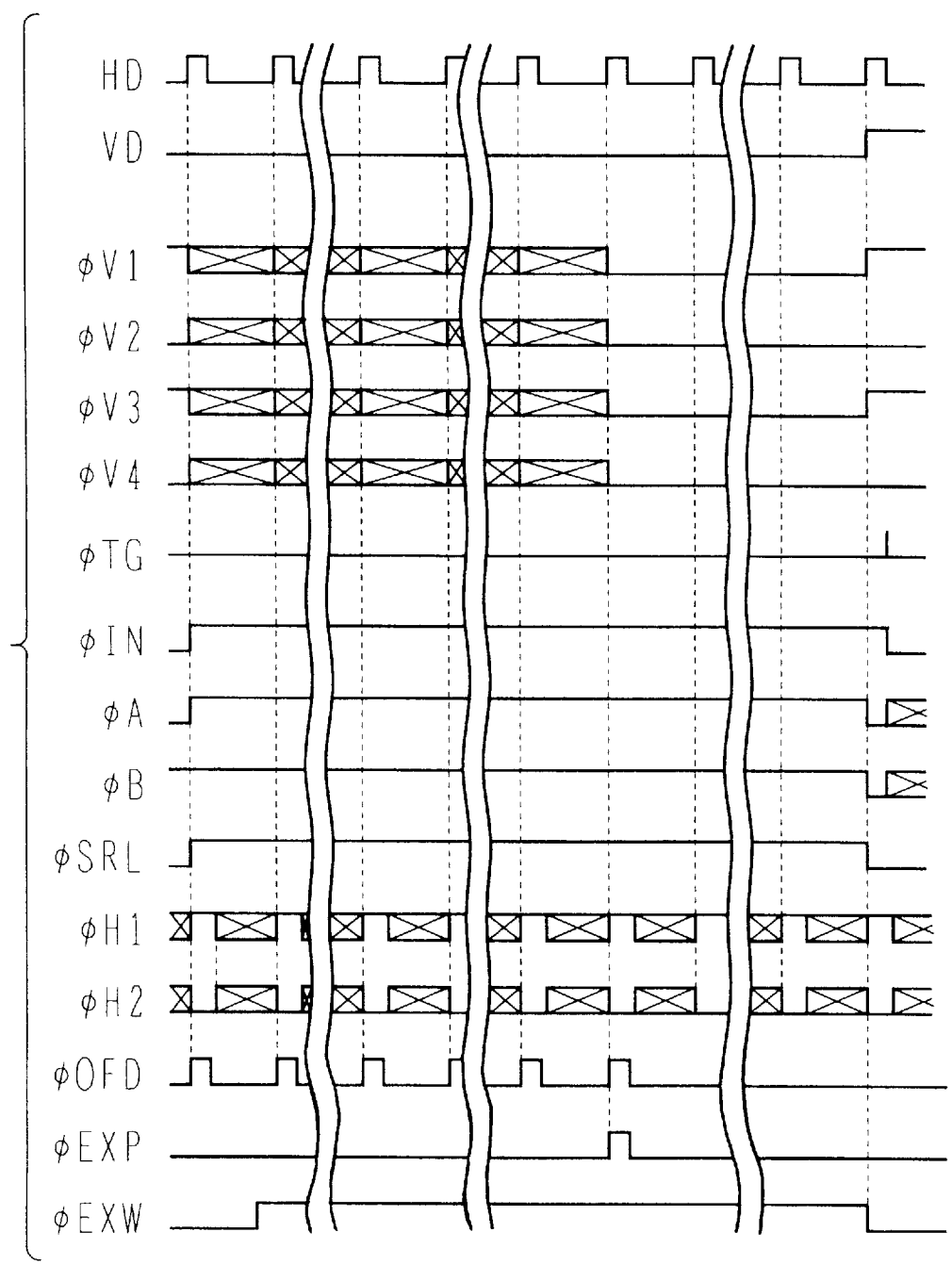
FIG. 13 is a timing chart for illustrating major signals generated during a smear charge sweep-away period and an exposure period in operation of the solid-state image pickup device shown in FIGS. 1 and 19.

FIG. 13 is a detailed timing chart illustrating major signals generated during a smear charge sweep-away period and a pinning exposure period. More specifically, shown in FIG. 13 are a horizontal synchronizing signal HD, a vertical synchronizing signal VD, vertical CCD drive signals φV1 to φV4, a signal charge read signal φTG, control signals φIN, φA, φB and φSRL, horizontal CCD drive signals φH1 and φH2, a substrate sink control signal φOFD for expelling the electric charges stored in the photodiodes to the substrate, an exposure start signal φEXP and an exposure-ready signal φEXW in this order, as viewed from the top of the chart.

During the smear charge sweeping-away period, the control signals φIN, φA, φB and φSRL supplied to the shift register are all set to high level and the vertical CCD drive signals φV1 to φV4 are changed at a timing described later on by reference to FIG. 15A. Because all the control signals φIN, φA, φB and φSRL are at high level, all the shift signals S assume high level, as can be seen in FIG. 3. As a result of this, all the transfer electrodes of the vertical CCDs are supplied with the drive signals, as described previously by reference to FIG. 2.

The electric charges stored at areas underneath the transfer electrodes of the vertical CCDs (i.e., vertical charge transfer paths) are transferred to the horizontal CCD (horizontal charge transfer path) in synchronism with the drive signals. The electric charges received by the horizontal CCD are outputted externally from the solid-state image pickup device in synchronism with the horizontal CCD drive signals φH1 and φH2.

During the smear charge sweeping-away period, the substrate sink control signal φOFD is periodically supplied. Accordingly, the electric charges generated by the photodiodes during this period are dispelled to the substrate on a periodical interval. Parenthetically, the smear charge sweep-away operation is not stopped even when the exposure-ready signal φEXW is supplied. Upon light emission from the strobe lamp (i.e., flash lamp) in response to depression of the shutter release, the exposure start signal φEXP is inputted.

In response to the input of the exposure start signal φEXP, all the vertical CCD drive signals φV1 to φV4 are set to low level and the smear charge sweep-away operation is stopped, whereby the area underneath all the electrodes of the vertical CCDs are placed to a pinning state. Simultaneously, supply of the substrate sink control signal φOFD is interrupted. Upon interruption of the substrate sink control signal φOFD, the electric charges generated by the photodiodes are stored therein. In this way, the electric charge accumulation due to the exposure is started by the exposure start signal φEXP.

Immediately before the end of the exposure process the vertical CCD drive signals φV1 and φV3 are set to middle level, whereupon the signal charge read signal φTG is temporarily set to high level to thereby allow the electric charges stored at the photodiodes to be transferred to the areas located beneath the transfer electrodes of the vertical CCD. The exposure process then comes to an end.

When the vertical CCD drive signals φV1 to φV4 are fixed at low level during the exposure period, the channel regions beneath the transfer electrodes are inverted, hereby the surface or interface states becomes filled with holes. For this reason, generation of the dark current under the influence of the surface or interface states can successfully be suppressed.

When subjected to irradiation with light of high intensity as in the case of the exposure with the strobe light, the electric charges tend to leak into the vertical charge transfer path, resulting in accumulation of smear charges in the vertical charge transfer path. The smear charges can be swept away by performing the smear charge sweeping operation during the exposure process as well. Thus, when the electric charges are transferred from the photodiodes to the vertical CCD (i.e., vertical charge transfer path) before the smear charges are swept away, the smear charges and the signal charges are mixed together. Because the smear charge is transferred over a predetermined distance in the vertical CCD when the electric charges are transferred to the vertical CCD, there makes appearance an image (ghost image) ascribable to the smear charge at a location corresponding to the above-mentioned distance in the vertical charge transfer path, as viewed in the transfer direction.

Generation of such ghost image due to the smear charges can be prevented by stopping the vertical CCD driving operation during the exposure period.

Besides, because the smear charge sweeping operation is performed to a time point immediately before the start of the exposure, the smear charges can efficiently be swept out. By way of example, when the vertical CCDs are set to the pinning state by stopping the smear charge sweeping operation in response to the exposure-ready signal φEXW, it is impossible to sweep away these smear charges which are generated during a period from the reception of the exposure-ready signal φEXW to the reception of the exposure start signal φEXP.

Figure 14A:
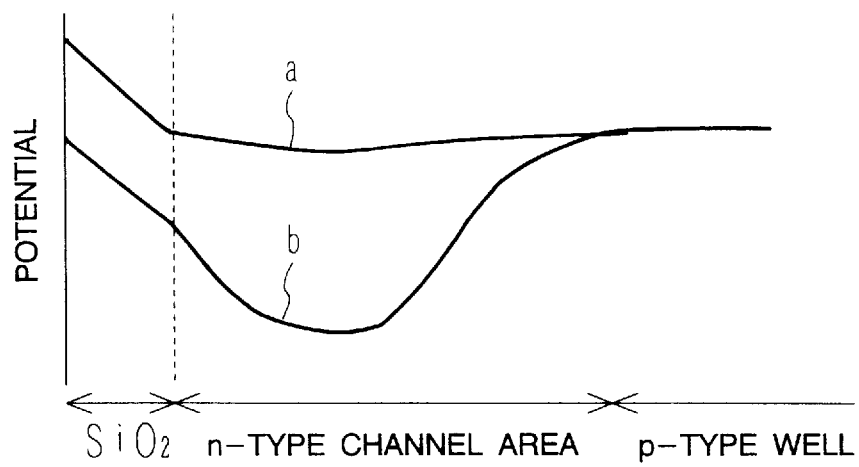
FIGS. 14A to 14C are views for graphically illustrating a potential profile beneath transfer electrodes and state in which smear electric charges are stored underneath the transfer electrodes.
Figure 14B:
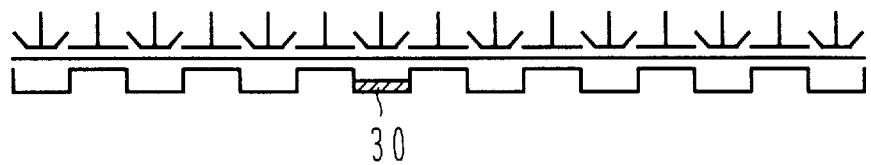
Figure 14C:
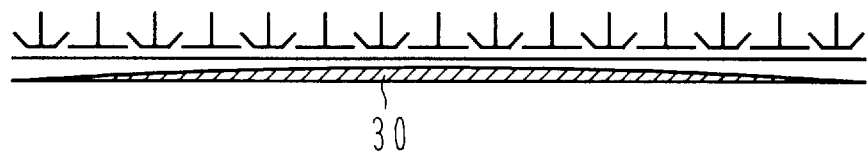

Next, referring to FIG. 14A to 14C, consideration will be paid to the problem which arises when the smear charges generated during the period from the reception of the exposure-ready signal φEXW to the reception of the exposure start signal φEXP can not be swept away.

FIG. 14A is a view for illustrating a potential profile in the area located beneath an transfer electrode of the vertical CCD. In the figure, a depth of a substrate is taken along the abscissa. The transfer electrode is located at the left-hand end of the abscissa and followed by an $SiO_2$-film, n-type channel region and a p-type well in this order. Taken along the ordinate is a potential level. A curve a represents a potential profile in the pinning state while a curve b represents a potential profile in the electric charge storage state.

As can be seen from the curve a shown in FIG. 14A, a shallow potential well exists in the vicinity of the substrate surface even when the vertical CCD is set to the pinning state. Thus, the smear charges, if generated, are stored in this potential well.

FIG. 14B is a view for illustrating a potential profile underneath the vertical charge transfer path in the case where the transfer electrodes are set alternately to a electric charge storage state and a barrier state, and FIG. 14C shows a corresponding potential distribution in the pinning state. As can be seen from FIG. 14B, when the transfer electrodes are set alternately to the store state and the barrier state, the smear charge 30 is stored underneath the transfer electrode which in the storage state.

By contrast, when the vertical CCD is in the pinning state, the smear charges 30 are diffused in transfer direction, because the potential barrier does not exist as shown in FIG. 14C. Thus, when the smear charge sweeping operation is stopped upon reception of the exposure-ready signal φEXW, the smear charges generated up to the time point at which the exposure is started are diffused in the vertical CCD, which will cause the picture or image to blur. Such blurring of the image due to the diffusion of the smear charges can be avoided by effecting the smear charge sweeping operation up to a time point immediately before the exposure is started as shown in Fig.13.

Figure 15A:
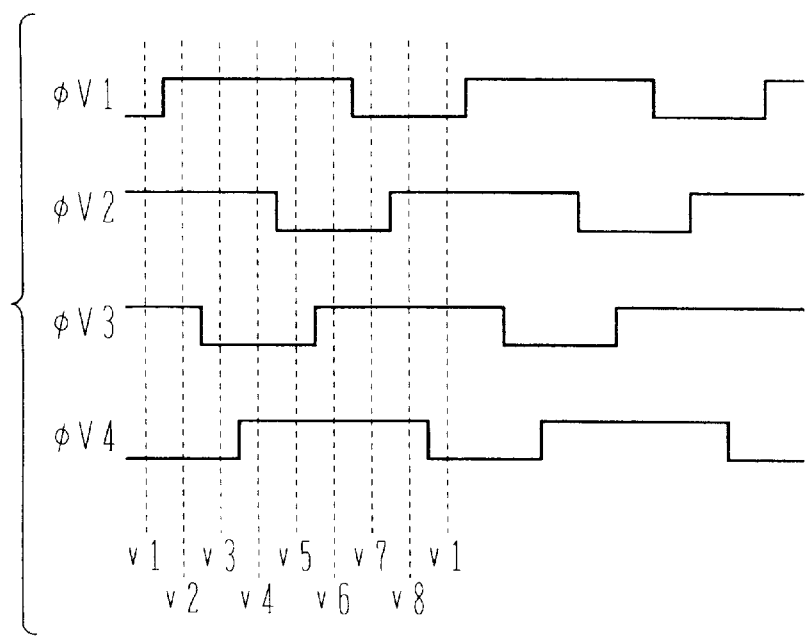
FIG. 15A is a timing chart of a vertical CCD drive signals in a smear charge sweep-away period.
Figure 15B:
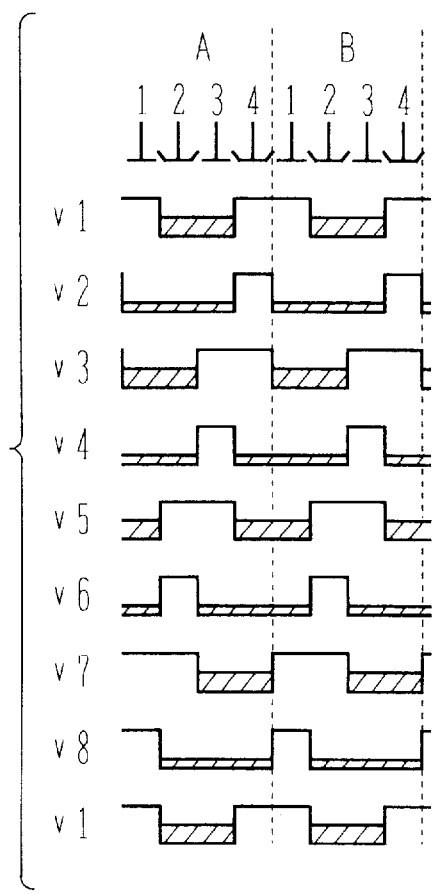
FIG. 15B is a schematic diagram showing potential distribution in channel regions.

Next, a vertical CCD driving method during the smear charge sweep-away period will be described by reference to FIGS. 15A and 15B, wherein FIG. 15A is a timing chart of the vertical CCD drive signals φV1 to φV4, and FIG. 15B is a potential diagram similar to FIG. 8 or FIG. 18.

It is assumed that at the time v1, there are stored smear charges underneath transfer electrodes A2, A3, B2 and B3. When the vertical CCD drive signal φV1 becomes high at a time point v2, potentials underneath the transfer electrodes A1 and B1 becomes lowered, as a result of which the smear charges are distributed beneath the transfer electrodes A1 to A3 and B1 to B3.

At a time point v3, the vertical CCD drive signal φV3 becomes low. As a consequence, the potential levels underneath the transfer electrodes A3 and B3 rise up, whereby the smear charges are confined underneath the transfer electrodes A1, A2, B1 and B2. In this manner, the smear charge is shifted by a distance corresponding to one transfer electrode.

When the vertical CCD drive signal φV4 becomes high at a time point v4 with the vertical CCD drive signal φV2 becoming low at a time point v5, the smear charge is caused to shift by one transfer electrode. In a similar manner, after lapse of the time from a time point v6 to a time point v8, the smear charges lying at first underneath the transfer electrodes B2 and B3 are caused to shift to the areas beneath the transfer electrodes A2 and A3. Thus, by changing the vertical CCD drive signals φV1 to φV4 at the timing mentioned above, the smear charge is caused to move by a distance corresponding to four electrodes and hence by two rows of the photodiodes.

Differing from the signal charge, the smear charges need not be transferred by evading the mixing of the electric charges stored beneath every other transfer electrode. Thus, a driving method of transferring the smear charges while mixing the charge stored under two adjacent transfer electrodes, as illustrated in FIG. 15A, can be adopted.

The smear charge is of a small quantity when compared with the signal charge (generally, the former is 0.1 to 0.01% of the latter). Accordingly, the smear charges can be transferred satisfactorily even when the period of the drive signal is set shorter than that required for transferring the signal charges.

More specifically, when the period of the drive signal for transferring the signal charge is, for example, about 6.2 ms, the period of the drive signal for transferring the smear charge may be selected about 2.2 ms. Thus, by reducing the period of the drive signal for transferring the smear charge by a factor of about ½.8, the transfer rate can be increased by a factor of 2.8.

Upon completion of the exposure, the electric charges fetched by the vertical CCD (vertical charge transfer path) are transferred in accordance with the method described above by reference to FIG. 8 or the method illustrated in FIG. 18. In order to transfer the electric charges without incurring any appreciable charge mixing, it is required to supply the shift signal S only to a predetermined unit driver stage of the vertical CCD from the shift register (i.e., to set only the predetermined unit driver stage to high level) as mentioned previously in conjunction with FIGS. 8 and 18. At a time point at which the exposure is completed, all the control signals φIN, φA, φB and φSRL are at high level with the shift signal S being high level, as shown in FIG. 12. Accordingly, before validating the intrinsic driving period, the shift register has to be reset to thereby set all the shift signals S to low level (i.e., to output the shift inhibit signal).

Figure 16A:
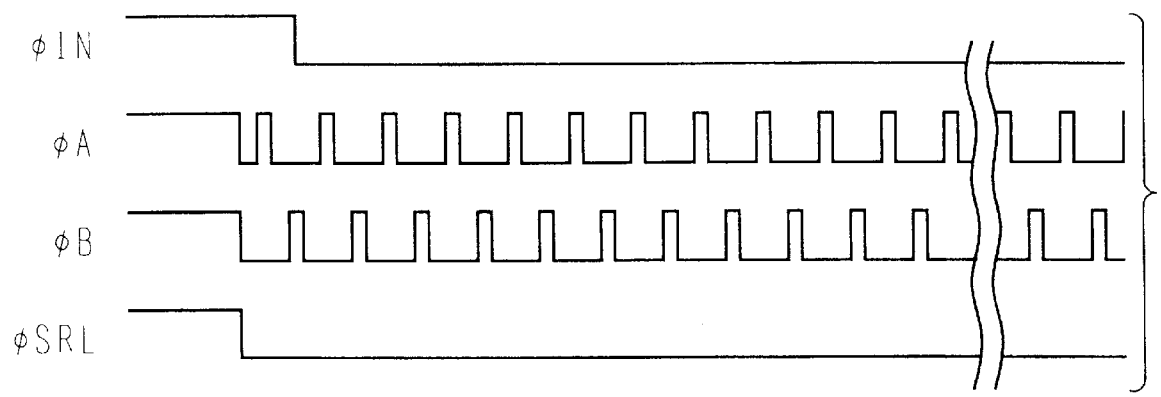
FIGS. 16A and 16B are timing charts showing control signals for illustrating methods of resetting a shift register of a structure shown in FIG. 3.

FIG. 16A is a detailed timing chart of the drive signals during the shift register reset period. In the figure, the control signals φIN, φA, φB and φSRL are shown in this order sequentially, as viewed from the top of the chart.

The control signals φSRL and φIN are set to low level and pulses are superposed on the control signals φA and φB. The control signals φA and φB bear a phase relation equivalent to that illustrated in FIG. 4. Since the control signal φIN is fixed to low level, no shift signal is newly generated. Thus, only the shifting of the shift signal by the control signals φA and φB takes place. Accordingly, the individual shift stages SF of the shift register are sequentially reset in synchronism with the control signals φA and φB, respectively, whereby the output of the shift signal is interrupted.

Figure 16B:
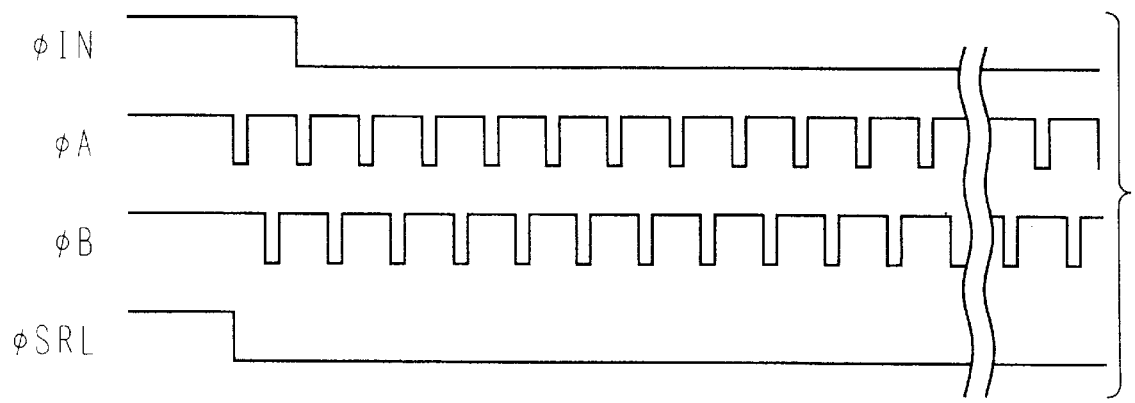

FIG. 16B is a timing chart for illustrating the case where the phase relation between the control signal φA and φB differs from that shown in FIG. 16A.

Figure 4:
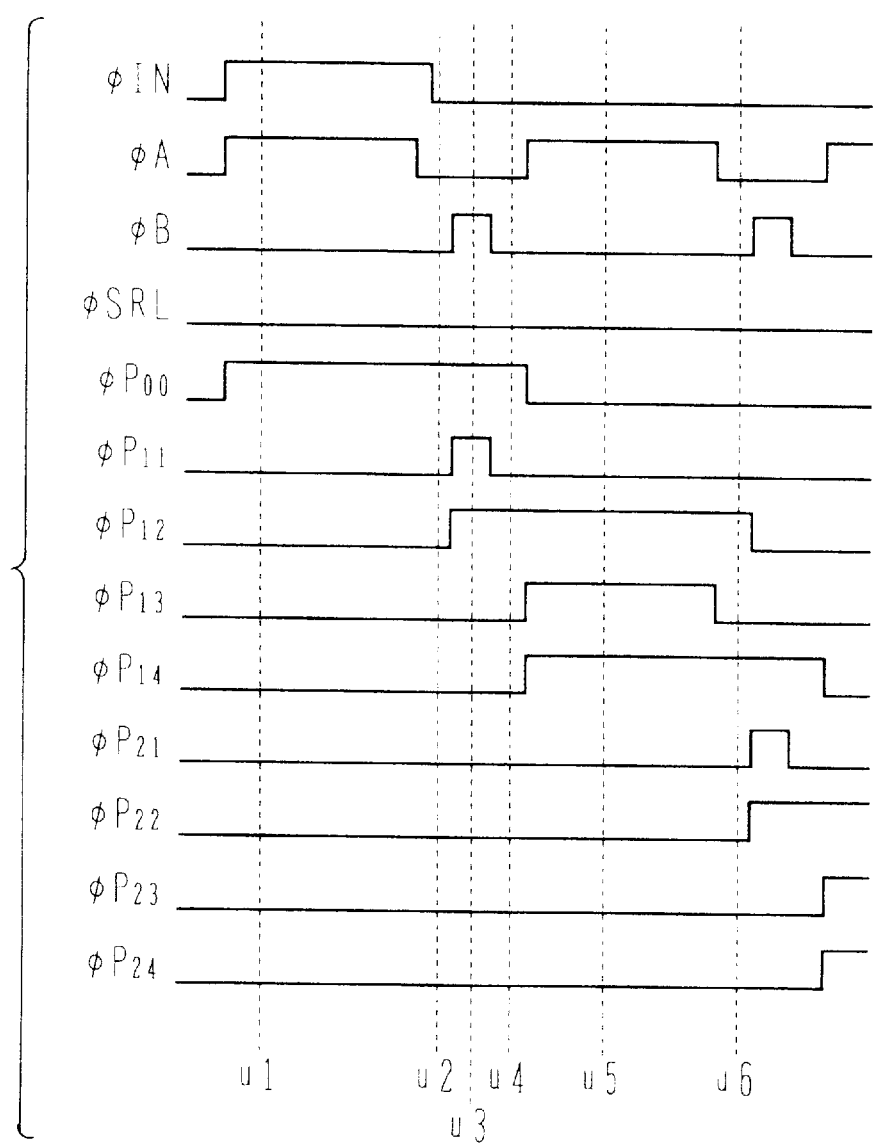
FIG. 4 is a timing chart for illustrating a control signal together with potentials at various circuit points in the arrangement shown in FIG. 3.

In the case illustrated in FIG. 16A, there exist periods during which both the control signals φA and φB (see time points u2 and u4 in FIG. 4). By contrast, in the case illustrated in FIG. 16B, there is no period during which both the control signals (A and OB are at low level. Reversely, there exists a period during which the control signals φA and φB are both at high level. In principle, although the shift register shown in FIG. 3 are driven at the timing illustrated in Fig.4 (or FIG. 16A), it is possible to reset the shift register at a timing shown in FIG. 16B. Parenthetically, it has experimentally been observed that the shift register can be reset more stably at the timing illustrated in FIG. 16B than the timing shown in FIG. 16A.

When the electric charges fetched by the vertical CCD are to be transferred in accordance with the scheme illustrated in FIG. 8 or 18, it is required to supply the vertical CCD drive signals φV1 to φV4 for one period while the control signal φA is at high level as shown in Fig.20A, which however means that the pulse width of the control signal φA has to be wider than the control signal φB.

On the other hand, when the shift register is to be reset, the pulse width of the control signal φA can be made equal to that of the control signal φB because of no necessity of supplying the vertical CCD drive signals φV1 to φV4. Besides, the pulse width can be made narrower when compared with the charge transfer through the vertical CCD, which in turn means that the shift register can be reset at a shorter interval.

Let's assume, by way of example, that the minimum unit clock $f_H$ is 70 ns. In that case, the period of the control signals φA and φB for the vertical CCD charge transfer shown in FIG. 20A has to be about 88 $f_H$ (6160 ns). By contrast, the period of the control signals φA and φB upon resetting the shift register shown in FIGS. 16A and 16B may be about 16 $f_H$ (1120 ns). In other words, by resetting the shift register at the timing shown in FIGS. 16A and 16B, the resetting operation can be effected about 5.5 times as rapidly as the resetting operation performed at the timing illustrated in FIG. 20A.

At this juncture, it should be mentioned that the transfer electrodes of the vertical charge transfer path (vertical CCD) is applied with the charge holding voltage STP and the barrier voltage BAW during the reset period. Thus, the electric charges fetched to the vertical CCD from the photodiodes are held in situ.

For resetting the individual shift stages of the shift register, the reset circuit should be provided for each of the shift stages for enabling all the shift stages to be reset simultaneously. However, in that case, design of the shift register will encounter limitation in respect to the layout because the individual shift stages have to be formed in correspondence to the photodiodes PD. It should be noted that according to the teachings of the present invention incarnated in the illustrated embodiments, the individual shift stages can be reset without need for providing a reset circuit.

Upon completion of the shift register reset operation, during the intrinsic driving period, the electric charges held by the vertical CCDs can be outputted in accordance with the method described previously in conjunction with FIG. 8 or FIG. 18.

Numerous modifications and combinations will readily occur to those skilled in the art. It is not intended to limit the invention to the exact construction and operation illustrated and described.

We claim:

1. A method of driving a solid-state image pickup device comprising photoelectric conversion elements disposed in a matrix-like array, a plurality of columns of vertical charge-coupled devices each disposed adjacent to each column of said photoelectric conversion elements, said vertical charge-coupled device being arranged in a pixel section capable of picking up electric charges accumulated in said photoelectric conversion elements and a vacant packet section having a number of rows, and a horizontal charge-coupled device connected to said plurality of columns of vertical charge-coupled devices and capable of receiving in parallel electric charges transferred from said vertical charge-coupled devices and serially outputting said electric charges, said driving method comprising the steps of:

reading electric charges accumulated in a number of said photoelectric conversion elements simultaneously and storing said electric charges in said pixel sections of said vertical charge-coupled devices;

injecting vacant packets into a group of signal charges in each of said vertical charge-coupled devices, each of said vacant packets being in an electric-charge absent state, said vacant packets being dispersed into said group of electric charges and being present in every Nth row:

repeating said vacant packet injecting and dispersing step until the signal charge existing at a bottom row of said pixel section is transferred to a bottom row of said vacant packet section; and sending one row of vacant packets from said horizontal charge-coupled device to said vertical charge-coupled devices to shift said vacant packets upwardly through said vertical charge-coupled devices by M rows (where N>M) during a horizontal blanking period in each of said horizontal periods, while inhibiting the transfer of said vacant packets to said vertical charge-coupled devices during a horizontal scanning period in each of said horizontal periods to allow said electric charges corresponding to one row to be transferred through said horizontal charge-coupled device.

2. A method of driving a solid-state image pickup device according to claim 1, wherein said vacant packet dispersing step comprises the step of shifting said vacant packet to a topmost row of said pixel section.

3. A method of driving a solid-state image pickup device according to claim 1, wherein a product of the number of rows in said vacant packet section and said N is not smaller than the number of rows in said pixel section.

4. A method of driving a solid-state image pickup device according to claim 2, wherein a product of the number of rows in said vacant packet section and said N is not smaller than the number of rows in said pixel section.

5. A method of driving a solid-state image pickup device according to claim 1, wherein M is equal to "8", while N is an integer falling within a range of "32" to "48".

6. A method of driving a solid-state image pickup device according to claim 2, wherein M is equal to "8", while N is an integer falling within a range of "32" to "48".

7. A method of driving a solid-state image pickup device according to claim 3, wherein M is equal to "8", while N is an integer falling within a range of "32" to "48".

8. A solid-state image pickup device, comprising:

a plurality of photoelectric conversion elements disposed in a matrix-like array of columns and rows;

a plurality of columns of vertical charge-coupled devices, each disposed adjacent to each column of said photoelectric conversion elements and arranged within a pixel section capable of picking up electric charges accumulated in said photoelectric conversion elements and a vacant packet section having a number of rows;

a horizontal charge-coupled device connected to said plurality of columns of vertical charge-coupled devices and capable of receiving in parallel electric charges transferred from said vertical charge-coupled devices and outputting serially said electric charges; and a control circuit for transferring stored signal charges from all of said photoelectric conversion elements simultaneously to said vertical charge-coupled devices, injecting vacant packets into a group of signal charges in each of said vertical charge-coupled devices to disperse said vacant packets into said group of electric charges such that said vacant packets are present in every Nth row, sending one row of vacant packets from said horizontal charge-coupled device to said vertical charge-coupled devices to shift said vacant packets upwardly through said vertical charge-coupled devices by M rows (where N>M) during a horizontal blanking period in each of said horizontal periods.

9. A solid-state image pickup device according to claim 8, wherein each of said vertical charge-coupled devices is divided into a plurality of unit driver stages each including said photoelectric conversion elements in a plurality of consecutive rows;

said control circuit including a drive circuit for supplying a drive signal sequentially only to selected ones of said unit driver stages of said vertical charge-coupled devices.

10. A method of driving a solid-state image pickup device comprising:

photoelectric conversion elements disposed in a matrix-like array;

a plurality of columns of vertical charge-coupled devices each comprised of transfer electrodes provided in association with each of said photoelectric conversion elements and arrayed in a columnwise direction, each of said transfer electrodes being capable of fetching electric charge stored in said associated photoelectric conversion element into a channel region underlying each of said transfer electrodes and capable of transferring said electric charges in the columnwise direction in synchronism with a drive signal;

a horizontal charge-coupled device connected to said plurality of columns of vertical charge-coupled devices and capable of receiving in parallel the electric charges transferred from said vertical charge-coupled devices and serially outputting said electric charges;

said transfer electrodes constituting said vertical charge-coupled devices being divided into a plurality of sets, each including the transfer electrodes corresponding to consecutive rows of said photoelectric conversion elements, said plurality of sets constituting a plurality of unit driver stages, respectively;

a shift register including a plurality of shift stages connected in cascade form to each other, for outputting either one of a shift signal and a shift inhibit signal, an input terminal for inputting either one of said shift signal and said shift inhibit signal to the shift stage corresponding to the unit driver stage located at an end of said vertical charge-coupled device connected to said horizontal charge-coupled device, the signal inputted to said input terminal being sequentially shifted through said shift stages in synchronism with a clock signal supplied externally; and drive signal control means for supplying said drive signal to the transfer electrodes of the unit driver stage corresponding to the shift stage from which said shift signal is outputted, while inhibiting supply of said drive signal to the transfer electrodes of the unit driver stage corresponding to the shift stage from which said shift inhibit signal is outputted, said driving method comprising:
- an electric charge fetching step of fetching signal charges stored in a number of said photoelectric conversion elements into channel regions each underlying said transfer electrodes;
- a reset step of inputting said shift inhibit signal to said input terminal while supplying said clock signal to said shift register, to thereby allow said shift inhibit signal to be outputted from all of said shift stages; and
- a vertical transfer step of inputting the shift signal to said input terminal while supplying said clock signal to said shift register to thereby cause the shift stage outputting said shift signal to be sequentially shifted while supplying said drive signal to each of the transfer electrodes of the unit driver stage corresponding to the shift stage outputting said shift signal, for thereby allowing the electric charges stored underneath said transfer electrodes to be transferred along said vertical charge-coupled devices.

11. A method of driving a solid-state image pickup device according to claim 10,
wherein in said reset step, said clock signal has a higher frequency than said clock signal in said vertical transfer step.

12. A method of driving a solid-state image pickup device according to claim 10,
further comprising a smear charge sweep-away step of causing all of said shift stages to output the shift signals while supplying the drive signal to said vertical charge-coupled devices, for thereby allowing the electric charges stored underneath said transfer electrodes to be transferred to said horizontal charge-coupled device along said vertical charge-coupled devices, and driving said horizontal charge-coupled device so as to sweep away the electric charges transferred thereto externally of said solid-state image pickup device.

13. A method of driving a solid-state image pickup device according to claim 11,
further comprising a smear charge sweep-away step of causing all of said shift stages to output the shift signals while supplying the drive signal to said vertical charge-coupled devices, for thereby allowing the electric charges stored underneath said transfer electrodes to be transferred to said horizontal charge-coupled device along said vertical charge-coupled devices, and driving said horizontal charge-coupled device so as to sweep away the electric charges transferred thereto externally of said solid-state image pickup device.

14. A method of driving a solid-state image pickup device according to claim 10,
further comprising an exposure step of causing all of said shift stages to output the shift signals for thereby establishing a state in which said drive signal can be supplied to all of said unit drive stages, while setting said vertical charge-coupled devices to a pinning state by inhibiting said drive signal, whereupon an exposure process is executed.

15. A method of driving a solid-state image pickup device according to claim 11,
further comprising an exposure step of causing all of said shift stages to output the shift signals for thereby establishing a state in which said drive signal can be supplied to all of said unit drive stages, while setting said vertical charge-coupled devices to a pinning state by inhibiting said drive signal, whereupon an exposure process is executed.

16. A method of driving a solid-state image pickup device according to claim 12,
further comprising an exposure step of causing all of said shift stages to output the shift signals for thereby establishing a state in which said drive signal can be supplied to all of said unit drive stages, while setting said vertical charge-coupled devices to a pinning state by inhibiting said drive signal, whereupon an exposure process is executed.

17. A method of driving a solid-state image pickup device according to claim 13,
further comprising an exposure step of causing all of said shift stages to output the shift signals for thereby establishing a state in which said drive signal can be supplied to all of said unit drive stages, while setting said vertical charge-coupled devices to a pinning state by inhibiting said drive signal, whereupon an exposure process is executed.

18. A method of driving a solid-state image pickup device comprising photoelectric conversion elements disposed in a two-dimensional array and charge-coupled devices capable of fetching therein electric charges stored in said photoelectric conversion elements and outputting said fetched electric charges,
said driving method comprising:
- a smear charge sweep-away step for driving said charge-coupled devices to transfer smear electric charges, if stored in said charge-coupled devices, to thereby output said smear electric charges externally of the device;
- an exposure starting step for stopping said smear charge sweep-away operation in synchronism with an exposure start signal supplied externally to thereby set said photoelectric conversion elements to the state capable of storing electric charges;
- an exposure step for exposing said photoelectric conversion elements in a state in which the electric charge transfer through said charge-coupled devices is inhibited, to thereby store electric charges through photoelectric conversions performed by said photoelectric conversion elements; and
- a step of fetching electric charges stored at a number of said photoelectric conversion elements into said charge-coupled devices.

19. A method of driving a solid-state image pickup device according to claim 18,
wherein said photoelectric conversion elements are disposed in a matrix-like array;
wherein said charge-coupled devices include plurality columns of vertical charge-coupled devices each disposed adjacent to each column of said photoelectric conversion elements and capable of fetching electric charges stored at the associated photoelectric conversion elements and transferring the fetched electric charges, and a horizontal charge-coupled device connected to said plural columns of vertical charge-coupled devices for receiving in parallel the electric charges transferred from said vertical charge-coupled devices to thereby output the received electric charges by serially transferring said electric charges;
wherein in said smear charge sweep-away step, said vertical charge-coupled devices are driven to thereby transfer smear electric charges, if stored in said vertical charge-coupled devices, to said horizontal charge-coupled device, to thereby dispel said smear electric charges externally of the device;

wherein in said electric charge fetching step, electric charges stored at a number of said photoelectric conversion elements are fetched into said vertical charge-coupled devices; and wherein in said electric charge transfer and output step, the electric charges fetched into said vertical charge-coupled devices are extracted outwardly through said vertical charge-coupled devices and said horizontal charge-coupled device.

20. A method of driving a solid-state image pickup device according to claim 18, wherein in said electric charge storing step, said vertical charge-coupled device are set to a pinning state.

21. A method of driving a solid-state image pickup device according to claim 19, wherein in said electric charge storing step, said vertical charge-coupled device are set to a pinning state.

22. A method of driving a solid-state image pickup device according to claim 18, wherein when an object whose image is to be picked up is illuminated with light emitted from a flash lamp to thereby allow said photoelectric conversion elements to perform photoelectric conversion under exposure of reflected light of said flash lamp, said exposure start signal is generated in synchronism with light emission from said flash lamp.

23. A method of driving a solid-state image pickup device according to claim 19, wherein when an object whose image is to be picked up is illuminated with light emitted from a flash lamp to thereby allow said photoelectric conversion elements to perform photoelectric conversion under exposure of reflected light of said flash lamp, said exposure start signal is generated in synchronism with light emission from said flash lamp.

24. A method of driving a solid-state image pickup device according to claim 18, wherein in said smear electric charge sweep-away step, the electric charges stored underneath the transfer electrodes located adjacent to each other in said vertical charge-coupled device are transferred as a unit.

25. A method of driving a solid-state image pickup device according to claim 19, wherein in said smear electric charge sweep-away step, the electric charges stored underneath the transfer electrodes located adjacent to each other in said vertical charge-coupled device are transferred as a unit.

26. A method of driving a solid-state image pickup device according to claim 18, wherein said electric charge transfer and output step includes the steps of:

feeding vacant packets carrying no electric charge into each of said vertical charge-coupled devices from said horizontal charge-coupled device; and transferring electric charges corresponding to one row in said horizontal charge-coupled device in every given period during which said vacant packets are shifted along said vertical charge-coupled devices at least by two rows in a state in which said vacant packets are distributed in said vertical charge-coupled devices, and feeding vacant packets thus produced in the horizontal charge-coupled device into said vertical charge-coupled devices.

27. A method of driving a solid-state image pickup device according to claim 19, wherein said electric charge transfer and output step includes the steps of:

feeding vacant packets carrying no electric charge into each of said vertical charge-coupled devices from said horizontal charge-coupled device; and transferring electric charges corresponding to one row in said horizontal charge-coupled device in every given period during which said vacant packets are shifted along said vertical charge-coupled devices at least by two rows in a state in which said vacant packets are distributed in said vertical charge-coupled devices, and feeding vacant packets thus produced in the horizontal charge-coupled device into said vertical charge-coupled devices.

28. A method of driving a solid-state image pickup device according to claim 26, wherein a periodical interval at which said vertical charge-coupled devices are driven to transfer the smear electric charges stored in said vertical charge-coupled devices to said horizontal charge-coupled device in said smear charge sweep-away step is shorter than a periodical interval at which said vertical charge-coupled devices are driven in said vacant packet feeding step.

29. A method of driving a solid-state image pickup device according to claim 27, wherein a periodical interval at which said vertical charge-coupled devices are driven to transfer the smear electric charges stored in said vertical charge-coupled devices to said horizontal charge-coupled device in said smear charge sweep-away step is shorter than a periodical interval at which said vertical charge-coupled devices are driven in said vacant packet feeding step.

* * * * *